United States Patent
Santana

(10) Patent No.: US 10,851,758 B2
(45) Date of Patent: *Dec. 1, 2020

(54) HYDROKINETIC TRANSPORT WHEEL MOUNT

(71) Applicant: Jose Ramon Santana, Garland, TX (US)

(72) Inventor: Jose Ramon Santana, Garland, TX (US)

(\*) Notice: Subject to any disclaimer, the term of this patent is extended or adjusted under 35 U.S.C. 154(b) by 411 days.

This patent is subject to a terminal disclaimer.

(21) Appl. No.: 15/458,909

(22) Filed: Mar. 14, 2017

(65) Prior Publication Data

US 2017/0248113 A1 Aug. 31, 2017

Related U.S. Application Data

(63) Continuation-in-part of application No. 12/587,232, filed on Oct. 2, 2009, now Pat. No. 9,593,665.

(51) Int. Cl.
*F03B 13/10* (2006.01)
*F03B 17/06* (2006.01)

(52) U.S. Cl.
CPC ............ *F03B 13/10* (2013.01); *F03B 17/063* (2013.01); *F05B 2220/32* (2013.01); *F05B 2240/12* (2013.01); *F05B 2240/24* (2013.01); *F05B 2260/40311* (2013.01); *Y02E 10/22* (2013.01); *Y02E 10/28* (2013.01)

(58) Field of Classification Search
CPC .... F03B 13/10; F03B 17/063; F05B 2220/32; F05B 2240/12; F05B 2240/24; F05B 2260/40311; Y02E 10/22; Y02E 10/28

USPC .......... 290/52, 55, 54; 416/85, 119; 415/3.1, 415/4.2, 4.4
See application file for complete search history.

(56) References Cited

U.S. PATENT DOCUMENTS

| | | | | | |
|---|---|---|---|---|---|
| 4,517 A | \* | 5/1846 | Hand | ........................ | B63H 1/04 416/86 |
| 4,843 A | \* | 11/1846 | Rowand | ................ | F03B 13/264 415/3.1 |
| 302,769 A | \* | 7/1884 | Pallausch | ................ | F03D 3/067 416/119 |
| 436,595 A | \* | 9/1890 | Collins | ................. | F03B 17/063 416/119 |
| 679,109 A | \* | 7/1901 | Colman | ................ | F03D 3/0472 415/4.4 |
| 707,857 A | \* | 8/1902 | Marburg | ............... | F03B 17/063 415/7 |
| 973,869 A | \* | 10/1910 | Logan | ................... | F03B 13/264 415/141 |
| 1,276,374 A | \* | 8/1918 | Keller | ..................... | F03B 11/08 210/154 |
| 1,368,454 A | \* | 2/1921 | Rebman | ................. | F03B 17/063 416/85 |

(Continued)

*Primary Examiner* — Pedro J Cuevas
(74) *Attorney, Agent, or Firm* — Eugenio J. Torres-Oyola; Victor M. Rodriguez-Reyes; Rafael Rodriguez-Muriel

(57) ABSTRACT

An energy system including a turbine wheel totally submerge including a rotary element and a wheel mounting enclosure. The wheel mounting enclosure including a cavity where a rotary element rest on said mounting enclosure exposing the upper end to the flowing body of fluid it is submerged. The wheel mounting enclosure comprising several configurations such as a tapered base for increasing the incident flow velocity.

8 Claims, 16 Drawing Sheets

(56) References Cited

U.S. PATENT DOCUMENTS

| | | | | |
|---|---|---|---|---|
| 1,409,249 A * | 3/1922 | Shepard | F03B 17/063 | 416/85 |
| 1,649,644 A * | 11/1927 | Alexeeff | F03D 3/0454 | 415/141 |
| 1,810,113 A * | 6/1931 | Schlotzhauer | F03D 3/0472 | 415/2.1 |
| 1,850,721 A * | 3/1932 | Katzenberger | F03D 3/065 | 416/52 |
| 2,310,816 A * | 2/1943 | Taylor | F03B 17/065 | 415/141 |
| 3,902,072 A * | 8/1975 | Quinn | F03D 3/068 | 290/44 |
| 3,976,396 A * | 8/1976 | Antogini | F03D 3/067 | 416/119 |
| 4,004,861 A * | 1/1977 | Soules | F03D 3/067 | 416/119 |
| 4,052,134 A * | 10/1977 | Rumsey | F03D 3/067 | 416/119 |
| 4,053,787 A * | 10/1977 | Diggs | F03B 7/00 | 290/43 |
| 4,104,536 A * | 8/1978 | Gutsfeld | F03B 17/063 | 290/54 |
| 4,119,863 A * | 10/1978 | Kelly | H02S 10/12 | 290/55 |
| 4,156,580 A * | 5/1979 | Pohl | F03D 3/02 | 415/4.2 |
| 4,174,923 A * | 11/1979 | Williamson | F03D 3/02 | 415/211.1 |
| 4,233,892 A * | 11/1980 | Hawkins | A47J 37/042 | 415/5 |
| 4,260,325 A * | 4/1981 | Cymara | F03D 3/0481 | 415/4.4 |
| 4,260,902 A * | 4/1981 | Crider | F03B 3/08 | 290/43 |
| 4,270,056 A * | 5/1981 | Wright | F03B 17/063 | 290/54 |
| 4,278,896 A * | 7/1981 | McFarland | F03D 3/02 | 290/55 |
| 4,295,783 A * | 10/1981 | Lebost | F03B 13/145 | 290/54 |
| 4,346,305 A * | 8/1982 | White | F03B 17/065 | 290/55 |
| 4,350,900 A * | 9/1982 | Baughman | F03D 3/049 | 290/55 |
| 4,365,934 A * | 12/1982 | Mason | F03D 7/06 | 416/119 |
| 4,383,797 A * | 5/1983 | Lee | F03B 17/062 | 405/22 |
| 4,424,451 A * | 1/1984 | Schmidt | F03B 17/065 | 290/54 |
| 4,436,480 A * | 3/1984 | Vary | F03B 7/00 | 415/211.1 |
| 4,534,703 A * | 8/1985 | Flavell | F03D 3/068 | 416/119 |
| 4,551,066 A * | 11/1985 | Frisz | F03B 17/06 | 416/119 |
| 4,618,312 A * | 10/1986 | Williams | F03D 3/068 | 416/119 |
| 4,676,893 A * | 6/1987 | Travade | B01D 33/067 | 210/157 |
| 4,679,985 A * | 7/1987 | Worms | F03B 17/065 | 416/119 |
| 4,764,683 A * | 8/1988 | Coombes | F03D 3/0454 | 290/55 |
| 4,776,762 A * | 10/1988 | Blowers, Sr. | F03D 3/068 | 416/119 |
| 5,009,569 A * | 4/1991 | Hector, Sr. | F03D 3/04 | 415/4.1 |
| 5,051,059 A * | 9/1991 | Rademacher | F03B 17/062 | 415/3.1 |
| 5,083,899 A * | 1/1992 | Koch | F03D 3/0481 | 415/2.1 |
| 5,332,354 A * | 7/1994 | Lamont | F03D 3/0463 | 415/4.2 |
| 5,430,332 A * | 7/1995 | Dunn, Jr. | F03B 7/00 | 290/43 |
| 5,440,175 A * | 8/1995 | Mayo, Jr. | F03B 7/003 | 290/53 |
| 5,447,412 A * | 9/1995 | Lamont | F03D 3/0463 | 415/4.2 |
| 5,553,996 A * | 9/1996 | Farrar | F03D 3/065 | 415/2.1 |
| 5,850,108 A * | 12/1998 | Bernard | B60L 8/006 | 290/54 |
| 5,947,678 A * | 9/1999 | Bergstein | F03B 3/00 | 415/202 |
| 6,006,518 A * | 12/1999 | Geary | F03B 17/065 | 290/42 |
| 6,109,863 A * | 8/2000 | Milliken | F03B 17/065 | 415/1 |
| 6,158,953 A * | 12/2000 | Lamont | B64C 11/007 | 415/4.4 |
| 6,210,113 B1 * | 4/2001 | Ihrenberger | F03B 7/003 | 415/141 |
| 6,616,403 B1 * | 9/2003 | Smith | F03B 17/063 | 415/124.1 |
| 6,655,907 B2 * | 12/2003 | Brock | F03D 3/002 | 415/4.2 |
| 6,755,607 B1 * | 6/2004 | Hester | F03B 17/062 | 415/3.1 |
| 7,083,382 B2 * | 8/2006 | Ursua | F03D 3/005 | 416/110 |
| 7,086,824 B2 * | 8/2006 | Yang | F03D 3/0481 | 415/4.2 |
| 7,125,486 B1 * | 10/2006 | Chuang | E02B 8/023 | 210/155 |
| 7,466,035 B1 * | 12/2008 | Srybnik | F03B 17/063 | 290/43 |
| 7,521,816 B2 * | 4/2009 | Helfrich | F03B 13/264 | 290/43 |
| 7,564,144 B1 * | 7/2009 | Srybnik | F03B 13/00 | 290/54 |
| 7,591,635 B2 * | 9/2009 | Ryu | F03D 3/068 | 416/111 |
| 7,619,320 B2 * | 11/2009 | Omer | F03B 7/003 | 290/45 |
| 7,661,922 B2 * | 2/2010 | Belinsky | F03B 17/063 | 415/4.3 |
| 7,696,635 B2 * | 4/2010 | Boone | F03D 3/067 | 290/55 |
| 7,758,299 B1 * | 7/2010 | Jarecki | F03D 3/0418 | 415/4.2 |
| 7,880,322 B2 * | 2/2011 | Cumings | F03D 3/0472 | 290/54 |
| 7,902,687 B2 * | 3/2011 | Sauer | F03B 13/12 | 290/54 |
| 7,960,852 B2 * | 6/2011 | Cumings | F03D 3/02 | 290/55 |
| 7,969,034 B2 * | 6/2011 | Winius | F03B 17/063 | 290/43 |
| 8,011,876 B2 * | 9/2011 | Gradwohl | F03D 3/0481 | 415/4.2 |
| 8,076,791 B2 * | 12/2011 | Hostetler | F03B 17/067 | 290/54 |
| 8,096,749 B2 * | 1/2012 | Yang | F03D 3/0481 | 415/4.2 |
| 8,419,367 B2 * | 4/2013 | Fite | F03B 17/065 | 416/119 |
| 8,534,068 B2 * | 9/2013 | Yangpichit | H02K 7/1823 | 60/641.12 |
| 8,552,579 B2 * | 10/2013 | Richter | F03D 3/067 | 290/55 |
| 8,591,170 B1 * | 11/2013 | Rawls | F03D 3/002 | 415/4.2 |
| 8,829,704 B2 * | 9/2014 | Grigg | F03D 3/002 | 290/54 |
| 8,840,360 B2 * | 9/2014 | Quintal | F03D 3/002 | 415/4.1 |

(56) References Cited

U.S. PATENT DOCUMENTS

| | | | | |
|---|---|---|---|---|
| 8,847,423 B2* | 9/2014 | Wang | ............... | F03D 3/067 |
| | | | | 290/55 |
| 8,894,348 B2* | 11/2014 | Thacker, II | ........ | F03D 3/0472 |
| | | | | 415/4.4 |
| 9,024,463 B2* | 5/2015 | Boone | ............... | F03D 3/005 |
| | | | | 290/55 |
| 9,593,665 B2* | 3/2017 | Santana | ........... | F03B 17/063 |
| 2006/0245919 A1* | 11/2006 | Krizik | ............... | F03B 7/00 |
| | | | | 415/202 |
| 2007/0029805 A1* | 2/2007 | Marchetti | ......... | F03B 13/264 |
| | | | | 290/54 |
| 2013/0285382 A1* | 10/2013 | Grigg | ............... | F03D 3/002 |
| | | | | 290/54 |
| 2013/0328315 A1* | 12/2013 | Portolan | ........... | F03B 13/10 |
| | | | | 290/54 |
| 2017/0234288 A1* | 8/2017 | Williams | ........... | F03B 13/08 |
| | | | | 290/54 |
| 2018/0023540 A1* | 1/2018 | Lai | ............... | F03B 17/063 |
| | | | | 290/54 |

* cited by examiner

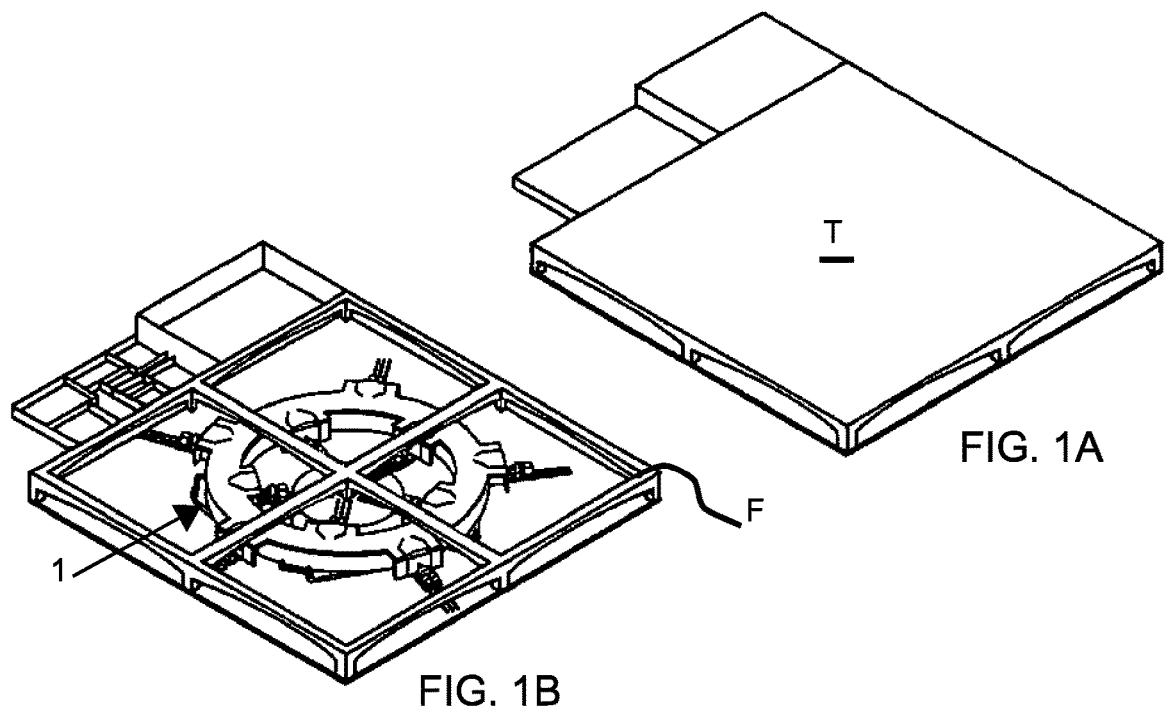
FIG. 1A
FIG. 1B
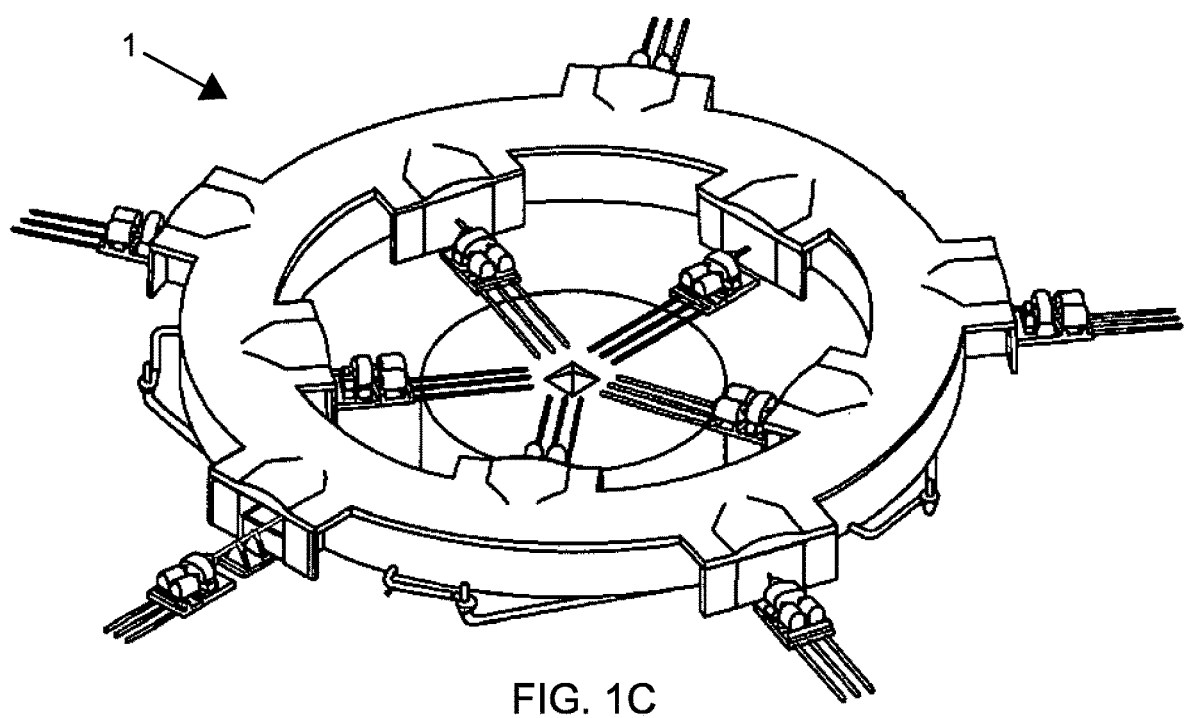
FIG. 1C

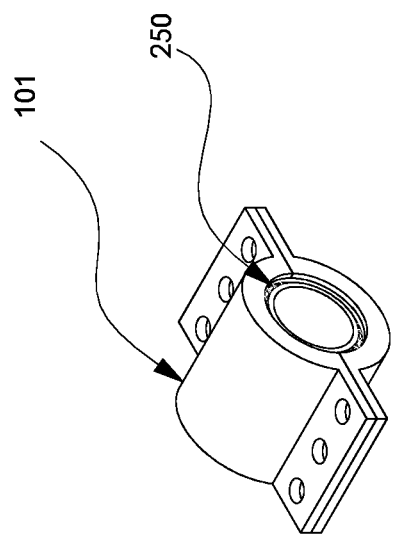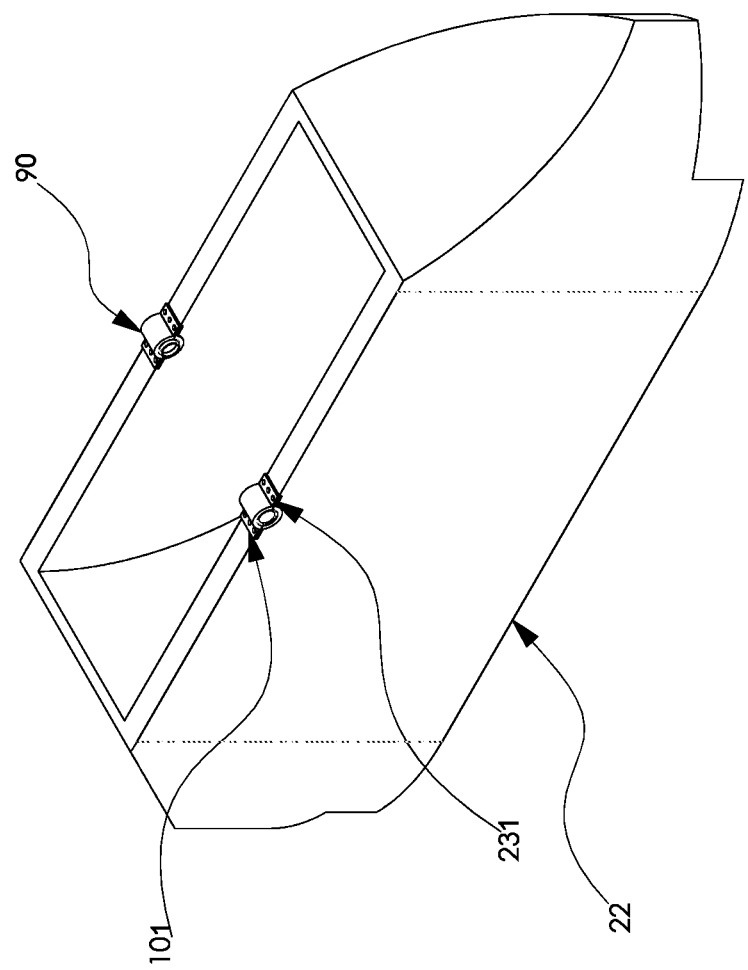
Fig. 13

HYDROKINETIC TRANSPORT WHEEL MOUNT

RELATED APPLICATIONS

Continuation-in-part of application Ser. No. 12/587,232, filed on Oct. 2, 2009, now U.S. Pat. No. 9,593,665

STATEMENT REGARDING FEDERALLY SPONSORED RESEARCH AND DEVELOPMENT

N/A

BACKGROUND OF THE DISCLOSURE

Field of the Invention

The present invention relates to a water wheel turbine for hydropower generation utilizing the head of a watercourse, generally a submersible waterwheel turbine with horizontal wheel shaft and a multiplicity of multifaceted cells uniformly spaced within the periphery and the interior of said waterwheel. The wheel is primarily intended for used in multiple environments with a multiplicity of water currents able to generate electricity from the kinetic energy contained therein.

Description of the Prior Art

The ancient Greeks invented the waterwheel and were, along with the Romans, the first to use it for both irrigation and as a power source. Significant improvements have been made to the waterwheel designed for energy production through the years; however, while these waterwheels may be appropriate for the designed purpose, they would not be as appropriate for green energy production as the present invention, described herein.

SUMMARY OF THE PRESENT INVENTION

The present invention relates generally to a water wheel apparatus and, more specifically, to a water wheel turbine that can operates while deployed partially or totally submerge by means of a wheel mounting enclosure body member having a cavity equal to 50% of the height of the runner or bottom half of the runner. Further the upper half of the runner is exposed gaining kinetic energy and momentum through water current acting upon a plurality of multifaceted cells attached to spokes radiating from a central hub to the outer perimeter of a wheel. The exposed facet rotates around it axis as they are pushed by the water incident flow on top of the wheel mounting enclosure. As the runner rotates a facet comes out of the cavity becoming a exposed facet wherein said exposed facet interact with the water incident flow on top of the mounting enclosure. The design allows the cells to transfer the kinetic energy from the water to the wheel shaft. The rotation positions the facet or kinetic driver inside the cavity until the kinetic drivers move into position of angle of attack to start again the cycle due to the exposed facet. The wheel consists of a hub and a shaft upon which said wheel rotates, multiple concentric radial rings body members with a plurality of spokes radiating from the outside perimeter of the central hub, traversing through the radial rings to the periphery of the runner, with spokes populated by a plurality of multifaceted cells like buckets that attached to the inside perimeter of said spokes extending from the central hub to the periphery of the runner. The outside surface of the runner attaches to a plurality of similar runners by means of mechanical devices and to the central hub. With means to anchor the apparatus by a wheel mounting body member having a cavity equal to 50% of the height of the runner where the runner exposes the upper half. The plurality of multifaceted cells ensures the wheel remains constantly engaged throughout the 180 degrees paralleled to the water incident flow by presenting a new facet as the water turbine progresses in its orbital travel as they are impacted simultaneously while occupying wall-to-wall the peripheral annulus of the water stream, as the wheel rotates in the axel. The kinetic energy stored in the wheel while rotating is harnessed through a drive shaft connected to the central hub that connects to a step-up gear and a generator placed perpendicular to the central hub. When the apparatus is deployed in land water flowing bodies or in the ocean, said frame member will be deployed in a land water flowing bodies or in the ocean, said frame member will be deployed in a platform containing all body members; restraining the platform from movement while deployed submerged, by a series of inverted pyramids shape protrusions at the bottom of the platform designed to settle imbedded or by forced penetration in the bed of the river or ocean where the apparatus may be used.

A primary object of the present invention is to provide a water wheel that may be used fully submerged in multiple environments with a multiplicity of water currents able to generate electricity from the kinetic energy contained therein;

Another object of the present invention is to provide a water wheel with a plurality of multifaceted cells or kinetic drivers substantially increasing the harvesting of the kinetic energy by using the full periphery of the wheel and interior.

Yet another object of the present invention is to provide a water wheel that is submersible and the complete operation of harvesting kinetic energy can be made totally to disappear from view, does not harm the wildlife and can respect the natural beauty of the landscape where it is used.

Another object of the present invention is to overcome the drawbacks which has prevented the utilization of the waterwheel turbine at the maximum radial capacity while immersed in the watercourse by allowing the wheel to rotate unimpeded while retreating inside the wheel mount and outside the water flow until progresses in its orbital travel and the cell/bucket begin a new cycle in the position of attack achieving acceleration thus able to generate electricity from the kinetic energy contained therein;

Yet another object of the present invention is to provide a water wheel with a drive shaft and generator that produces power.

Additional objects of the present invention will appear as the description proceeds

BRIEF DESCRIPTION OF THE DRAWINGS

FIGS. 1A-1C are views of the Hydrokinetic Transport Wheel or HKT-Wheel, in use in a large scale power plant named the Controlled Momentum Hydroelectric System, COMHES, fully operational under a typical covered environment.

FIG. 13 presents a perspective view of the present invention showing a mount comprising bearings.

DETAILED DESCRIPTION OF THE PREFERRED EMBODIMENTS

Figure 2:
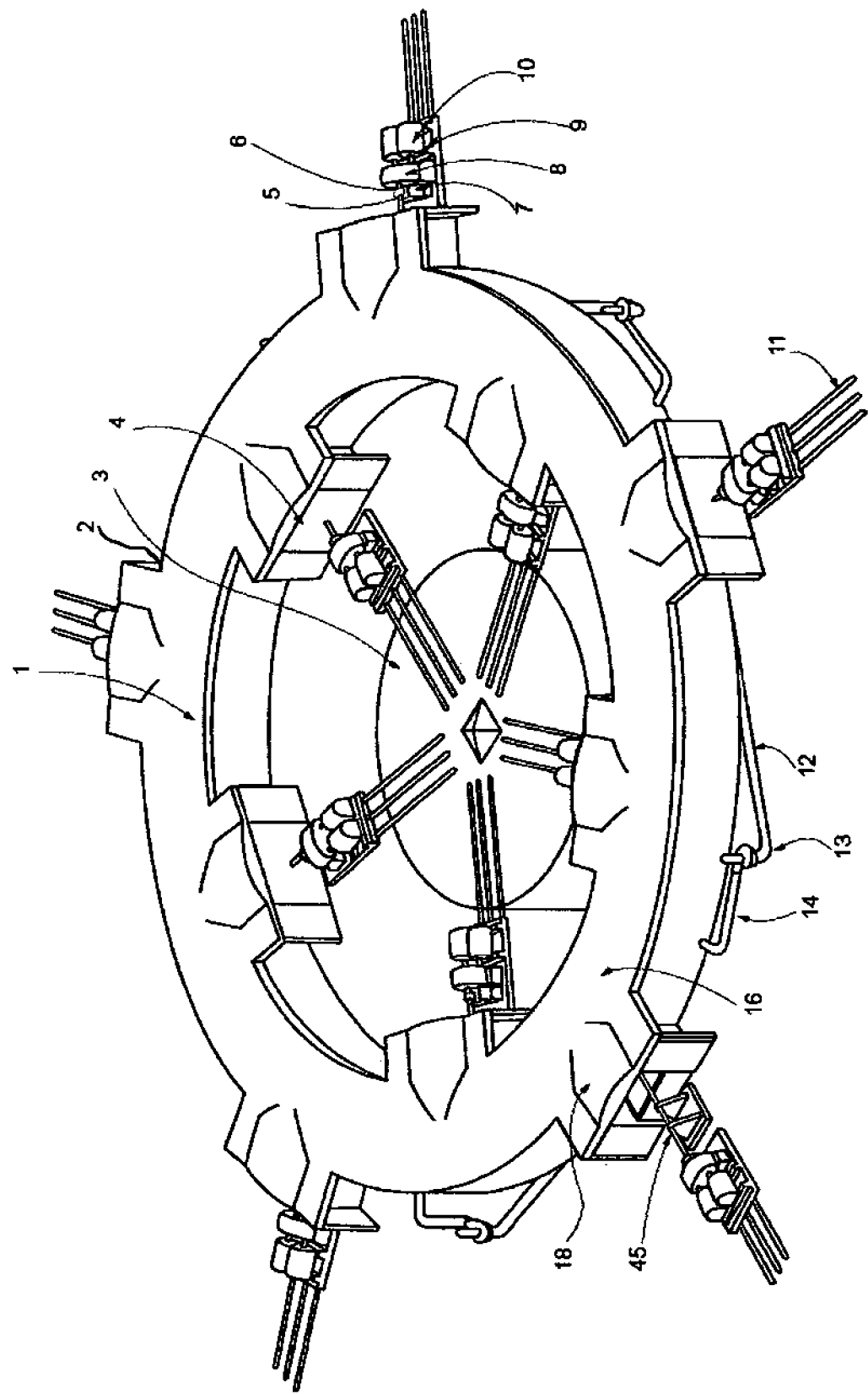
FIG. 2 is a perspective view of the HKT-Wheel without building enclosure frame.
Figure 3:
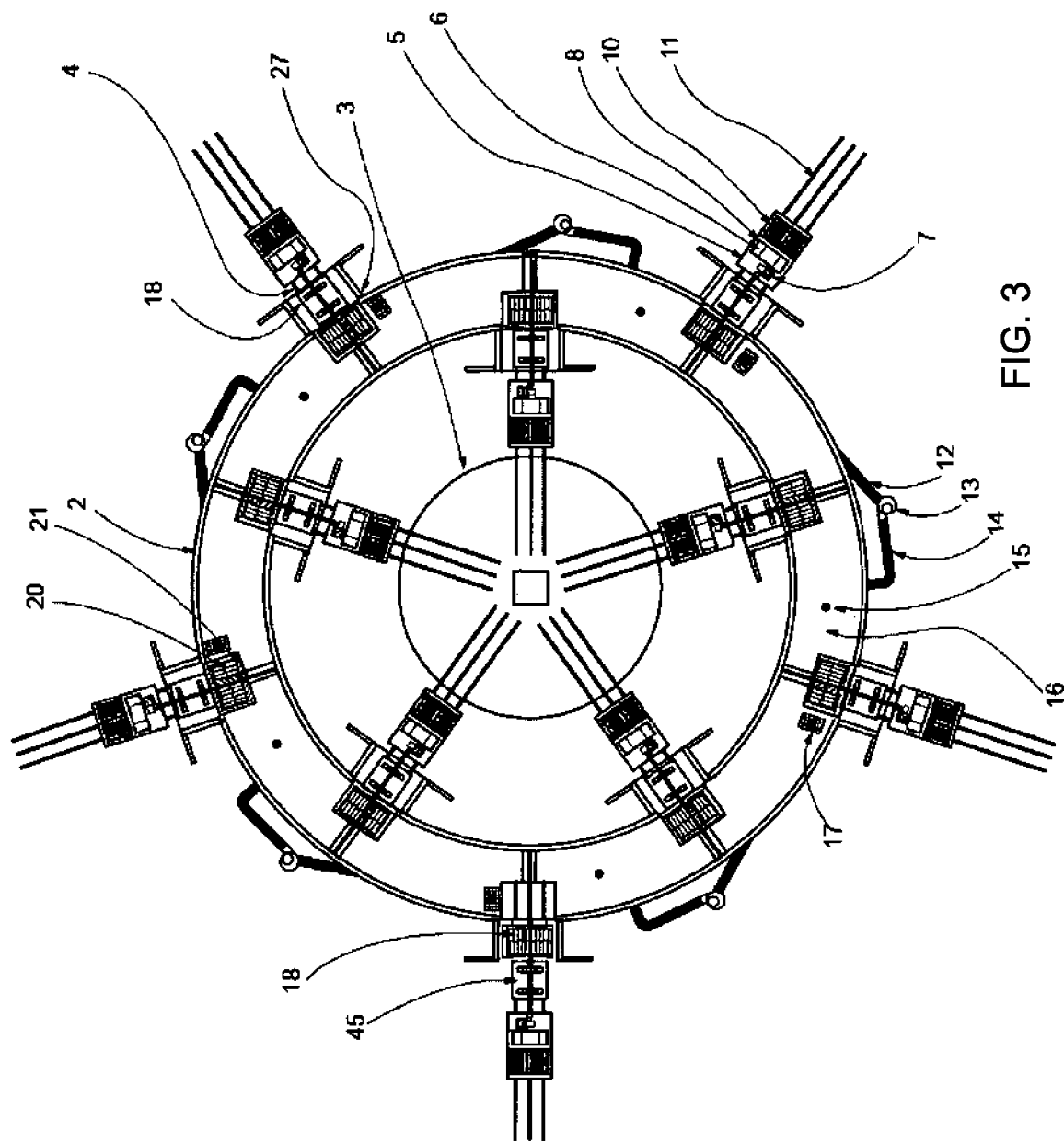
FIG. 3 is a top view of the large-scale power plant without container including the Hydrokinetic Transport Wheel.
Figure 4:
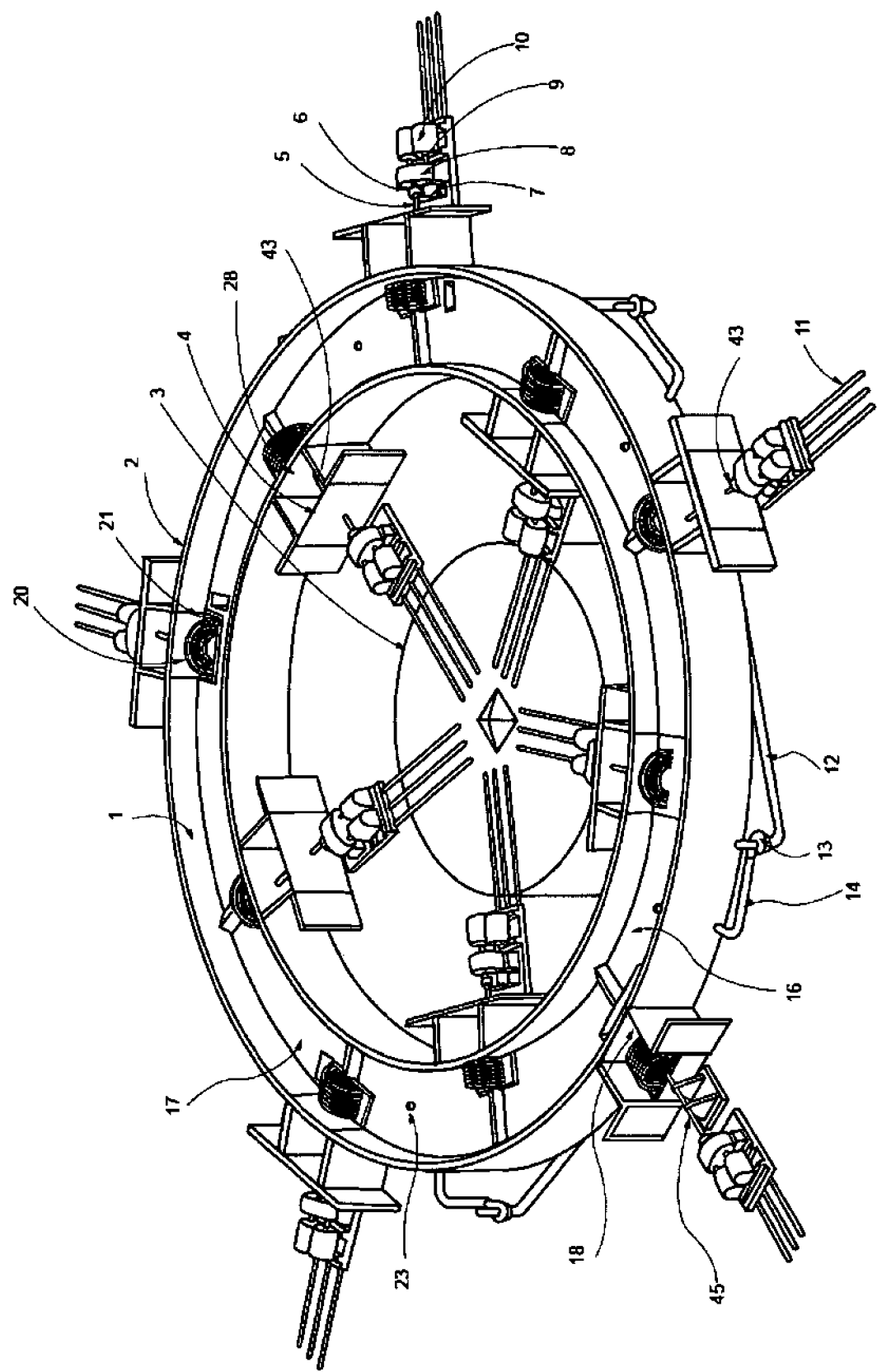
FIG. 4 is a perspective view of the present disclosure, the HKT-Wheel, in use in a large-scale power plant.

The following discussion describes in detail the embodiments of the invention and several variations of that apparatus. As a way of explanation it was chosen the mechanical process created by the Controlled Momentum Hydroelectric System (COMHES) 1 as the example model. A related sub-combination for the process using the HKT-Wheel 20 turbine is covered under different U.S. patent application Ser. No. 12/587,231 wherein the HKT-Wheel turbine 20 is a principal component in the COMHES 1, therefore it advantageous to explain the operation of the wheel turbine 20 using COMHES 1 as an example because the water velocities are created by a design providing the best environment to demonstrate the operation of the HKT-Wheel Turbine 20. However, similar behavior should be expected when the HKT-Wheel Turbine 20 is deployed on natural watercourses. All references to the COMHES 1 are solely related to the water velocities developed by the COMHES 1 process and at no time the components of the COMHES 1 are a part of the components of the HKT-Wheel Turbine 20, except as indicated in the drawings numerals. See the numerals for all the exclusion.

Figure 8:
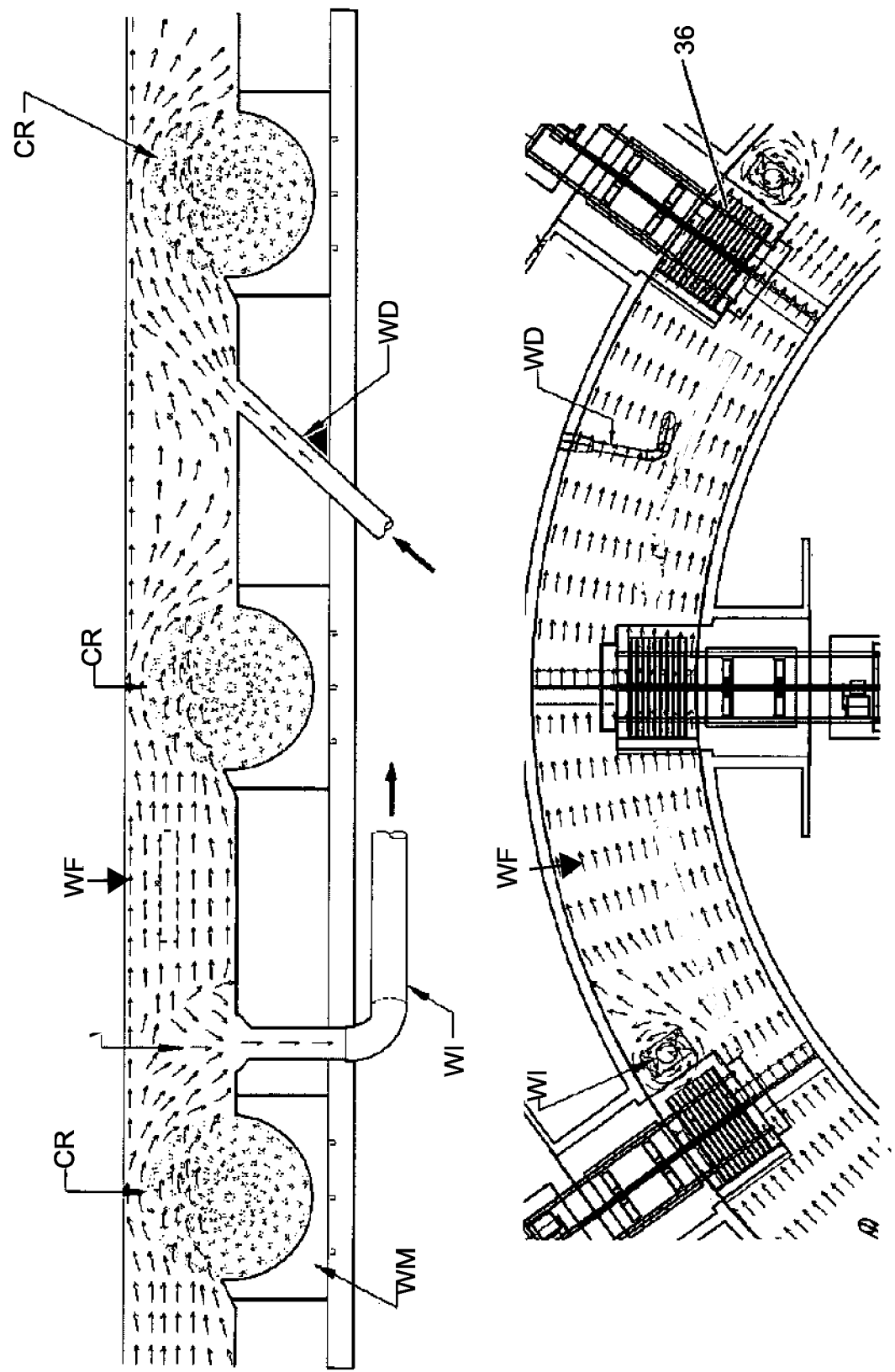
FIG. 8 is a longitudinal section view showing the water flow through the HKT-Wheel in use in a large-scale power plant.

Components identification as they appear in the drawings are as follow:
1. Controlled Momentum Hydroelectric System or COMHES
2. Internal Lining or Container/Tank to be reinforced by concrete structure
3. Underground Water Tank
4. Exterior Hydraulically Operated Double Slide Doors
5. Equipment Base
6. Electromagnetic Generator
7. Mechanical Drive
8. Step-up Gear
9. Improve Torque Drive Axel
10. Main Turbine Generator
11. Three Rail System
12. Pump Suction Line
13. Recirculation Pump System
14. Discharge Line
15. Pump Discharge Port
16.—High Velocity Channel
17. Pump Suction Port
18. Maintenance Chamber
19. Axle Housing Guide
20. Hydrokinetic Transport Wheel turbine
21. Wheel Well Mass
22. Static Lock or Mount
23. Pump Discharge Port
24. Channel Base
25. Bearing Mount (Left)
26. Bearing Mount (Right)
27. Wheel Drive Axel
28. Interior Hydraulically Operated Double Slide Doors
29. Axle Support
30. Intake Pipe Beyond
31. Multifaceted Kinetic Driver
32. Locking Pin Hole
33. Locking Pin
34. Periphery Radial Ring
35. Indicates travel of Locking Pin
36. Independent HKT-Wheels
37. Stress absorbing Circular Radial Rings
38. Spokes
39. Main Hub
40. Main Hub Key Slot
41. Drive shaft Key
42. Wheel Hub Locking Ring
43. Main Axle/Drive Shaft
44. Interlocking "x" Shaped Bracing Stress Proof Round Bars
45. System Pulled for Maintenance
46. Water Level
47. HKT-Wheels Deployed in the bed of the river/ocean
48. Anchoring Devices
49. Equipment Platform
50. Debris Deflector
51. Axle Support
60. Second step-up gear
70. Second generator mount
80. Second generator
90. Second right bearing mount
100. Second Hydrokinetic wheel assembly turbine
101. Second left bearing mount
110. Second main hub
112. Fourth bucket placed in a spoke
116. Interlocking "x" shaped cross bracing
117. Third bucket placed in a spoke
118. Second exemplary outer ring
119. Second exemplary first middle ring
120. Second exemplary second middle ring
121. Second exemplary inner ring
130. Second exemplary multifaceted cell/bucket 140. Second exemplary main hub key slot
150. Second exemplary spoke
200. Second exemplary main shaft
220. Second exemplary turbine mount
240. Second exemplary drive shaft key
250. Second exemplary bearing ring
260. Second exemplary anchoring spikes
280. Second exemplary improved rotational shaft
300. Second exemplary circular wheel frame
400. Second exemplary platform
500. Second exemplary step-up gear mount FIGS. 1, 2, 3 and 4 presents a perspective view of the present invention showing the hydrokinetic transport (HKT) wheel turbine 20 used in a large-scale power plant or the like 1 with a plurality of independent HKT-Wheels 36 being generally vertically disposed. The COMHES develops the necessary water velocities through the application of a multiplicity of recirculation pump system 13, powered by external sources and when the power plant develops operational velocities the wheel turbine 20 provides the mechanical drive to supply the electricity for the commercial market. See FIG. 8 for illustration. Similar behavior and results should be expected during the water wheel apparatus 20 in deployment in other watercourses of flowing bodies of water like the river or ocean FIG. 10, consistent with available water head.

Figure 5:
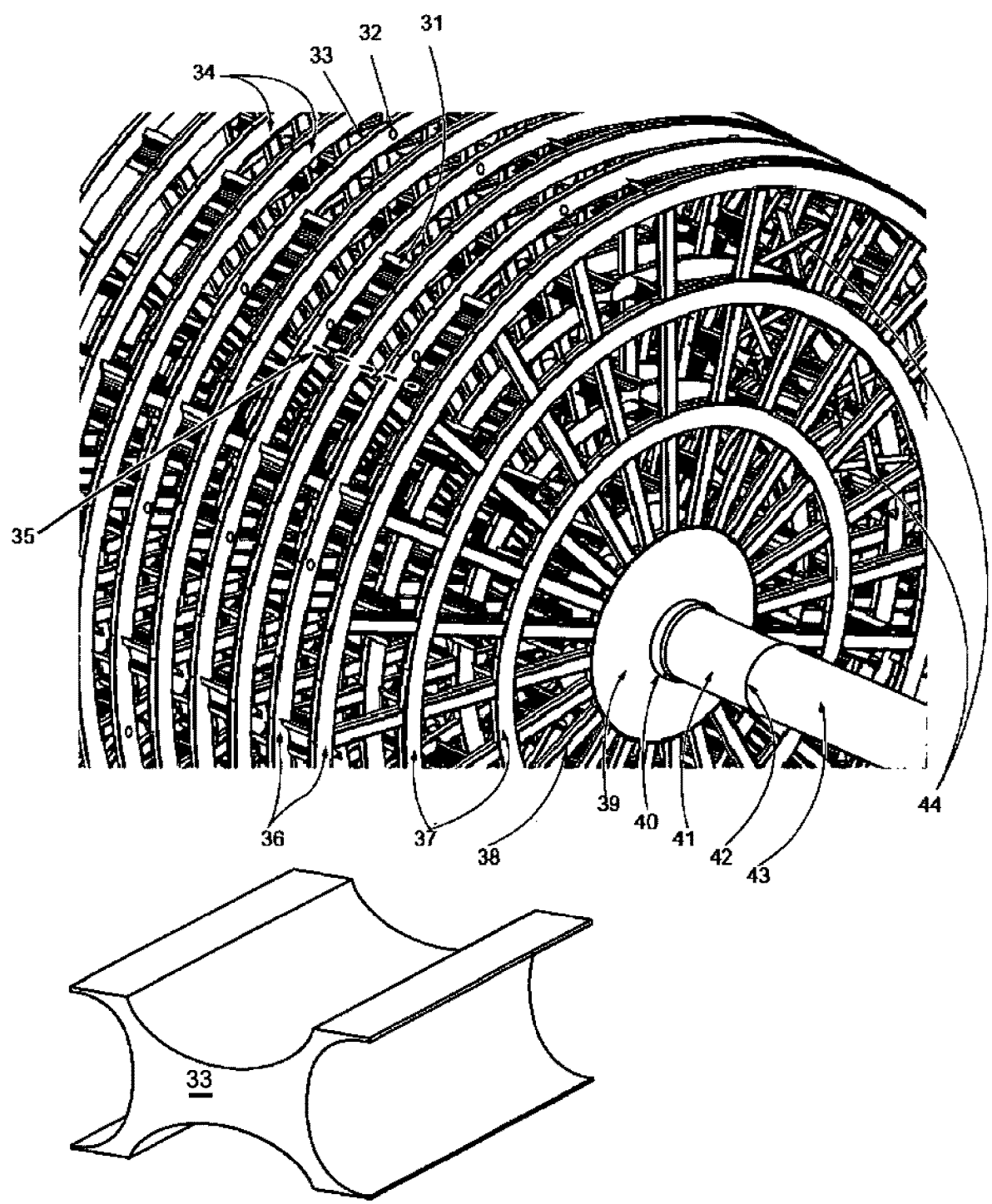
FIG. 5 is a partial view of the HKT-Wheel, enlarged for details and components' identification according to the present disclosure.

FIG. 5 is a partial view of the HKT-Wheel Turbine 20, showing a detailed identification of the different embodiments of the HKT-Wheel Turbine 20, particularly the independent HKT-Wheels 36 units. These independent HKT-Wheels 36 will be arrange-able in multiple configurations, including dimensions, length and height with the actual quantity of deployment dictated by the available water head; and when these independent HKT-Wheel 36 units are combined into a single unit for deployment, will be referred to as the Hydrokinetic Transport Wheel Turbine or HKT-Wheel Turbine 20. The independent HKT-Wheel 36 will be attached to each other by multiple fixed locking pins 33 (or other mechanical means), to matching locking pin holes 32 found distributed in the periphery radial ring body member 34. These independent wheel are locked further into the main shaft 43 as the independent HKT-Wheel 36 is slipped through a plurality of hub key slot 40 designed into the main hub 39, into a plurality of driveshaft keys 41 designed into the main axle 43, held in place by wheels' hub locking rings 42 positioned at each end of the HKT-Wheel Turbine 20, evidencing that the independent HKT-Wheel 36 have means for connection or being attached to each other to form the HKT-Wheel turbine 20. The wheel 20 will be able to work in both direction should the deployment location requires it.

The independent HKT-Wheel 36 units shown therein have one outer circular body member, to be referred hereinafter as the periphery radial ring body member 34, having a central circular body member which forms a hub-like central member, hereinafter the central/main hub 39, having means for rotatable connection centrally disposed therein, a main shaft 42 upon which these multiple independent wheels rotates with means to be connected to said hub 39, having generally twenty four spokes 38. These spokes 38 emanate radially there from to an outer, circular ring-like body member, referred hereinafter as buffering radial rings body member 37, which could be of single to multiple frequency depending on the needed capacity load, emanating radially there from to an outer from the previous buffering radial rings body member 37, these buffering radial rings body member 37 being attached to said spokes providing structural stability to the HKT-Wheel Turbine 20 and supplying support to the kinetic drivers 31 distributed throughout the HKT-Wheel Turbine 20, to the periphery radial ring body member 34.

A plurality of multifaceted cells 33 containing a multiplicity of buckets, are disposed inside the perimeter of the spokes 38 body members, further attached to the spokes 38 body members by mechanical means, following a set pattern; distributed between the main hub 39 and to the outer periphery radial ring body member 34 following the said set pattern; said multifaceted cells 33 being generally perpendicular to said spokes 38 body members. Each cell 33 is rectangular with four buckets of equal size each with a depression of 12" by 24" wide by 6' to 10' long forming a bucket in shape with the actual shape varying according to the available water head. The general appearance of a single cell of kinetic driver 31 is also shown. These kinetic drivers 31 are used to capture the energy from the water current allowing the harvesting of the kinetic energy by using 180 degrees of the waterwheel incident flow covering wall to wall the wheel 20 annulus.

The principles in which the invention is based are on Newton's Laws in the given interpretation of mass, acceleration, momentum, and (most importantly) force assumed to be externally defined quantities, but not the only interpretation of the way one can consider the laws to be a definition of these quantities. The third law states that all forces exist in pairs, establishing that "in waterwheels all internal forces are in equal opposite pairs, actions and reactions between neighboring masses. This means that when we sum over all parts of the wheel we count all these forces and they all cancel each other in pairs; therefore, the total torque is just that from the external forces." The third law implies that nothing could ever change its motion, since the two equal and opposite forces would always cancel each other. The two forces, however, are always on two different objects, so it would seem more appropriate to add them in the first place and we only add forces that are acting on the same object. Since the forces always maintain a relationship, the Newton's First and Second Laws will come into play where if an object is at rest will stay at rest unless an external force acts upon it. The second law states that the net force on an object is equal to the rate of change (that is, the derivative) of its linear momentum in an inertial reference frame.

This motion imparted by the kinetic drivers 31 follows the precepts of Newton's Third Law of Motion where we only count the spokes and the number of cell units of kinetic drivers 31 in contact with the water with minimum resistance by the accompanying pair that it is out of water or out of the influence of the water mass pound force masked by the wheel mounting enclosure; thus the wheel 20 will have a positive acceleration imparted and the degree of acceleration will depended on the net force after all positive and negative forces have been counted. Newton's Second Law establishes that if a force generates a motion, a double force will generate double the motion, a triple force triple the motion and so on, whether that force be impressed altogether at once, gradually or successively. The illustration model having 84 cells is very significant to the velocity imparted to wheel 20 having 42 cells constantly imparting acceleration to the runner 20. If we apply the precepts of Newton's Second Law, each cell of kinetic driver will be imparting an impulse thus a force that magnifies by the number of cells of kinetic drivers 31 applying impulse (forces). Once we know the net force of the resulting acceleration on an independent HKT-Wheel 36, a deployment of 4 independent wheels 36 will provide the runner 20 4 times the net force of an independent HKT-Wheel 36, 4 times the intensity imparted to the wheel axis, higher angular momentum with larger capacity for the electrical generator.

The number of rows of cells of kinetic drivers 31 will vary depending on the size of the HKT-Wheel Turbine 20 and the available water head. The example used in the presentation is exhibiting twelve spokes 38 with three cells of kinetic drivers 31 on each spoke 38 and twelve that will have four cells of kinetic drivers 31, corresponding sequentially to every other of the spokes 38, distributed between the outer periphery radial ring body member 34 and the wheel central hub 39 with a space between each cells of kinetic driver 31. This space is occupied by an interlocking X shape bracing 44; wherein said interlocking X shape bracing 44 are connected to the spokes 38, thus, the four cells of kinetic drivers 31 on the sequential spoke 38 that only have three cells of kinetic drivers 31 will be positioned in the following spoke body members 38 behind each open space. Therefore, between two sequential spokes body members 38 will cover wall to wall the wheel 20 peripheral annulus transferring the kinetic energy from the water to the wheel shaft 44 in the 180 degrees effective of the orbital wheel position.

When used in flowing river waters or the ocean, each independent HKT-Wheel 36 will have means added like a periphery radial ring body members 34 and/or debris deflecting accessories disposed proximate to said wheel and components whereby damage by water flowing debris is prevented.

A typical HKT-Wheel Turbine 20 has 4 independent wheels 36 and an independent HKT-Wheel 36 has, depending of design capacity load, a total of 84 type multifaceted cells of kinetic drivers 31; therefore, a 4 independent HKT-Wheel 36 will provide a total of 420 cells of kinetic drivers 31 to a typical HKT-Wheel Turbine 20 covering a minimum span of 24'. The design of multifaceted kinetic drivers 31 exploits the normal properties of water consistent with Bernoulli's principle which concluded that, pressure and velocity are inversely related, in other words, as one increases the other decreases and states that for all changes in movement, the sum of static and dynamic pressure in a fluid remains the same. Due to the Venturi effect in the reduction in fluid pressure that will result as the water flow is constricted by the reduced space between the kinetic drivers 31, the fluid velocity will increase to satisfy the equation of continuity, while the water pressure will decrease due to the conservation of energy, the gain in kinetic energy will be balanced by the drop in pressure or pressure gradient force. Therefore, based on this principle the distribution of the cells of kinetic drivers 31 on the spokes 38 will substantially increase the harvesting of the kinetic energy by using 180 degrees of the waterwheel 20 incident flows and allowing the water to flow through the waterwheel 20 and distribute the water pressure over the plurality of multifaceted cells of kinetic drivers 31. Higher number of kinetic drivers 31 in the radial direction translates into a greater reduction of the needed head without the loss of potentially recoverable kinetic energy. A larger separation will allow for larger size of the wheel 20 to contain larger kinetic drivers 31 where larger torque is required. A larger separation will prevent the increase of drag allowing better water flow though the wheel 20. The same purpose will be achieved by reducing the water head and reducing proportionally the separation of the kinetic drivers 31.

Figure 6:
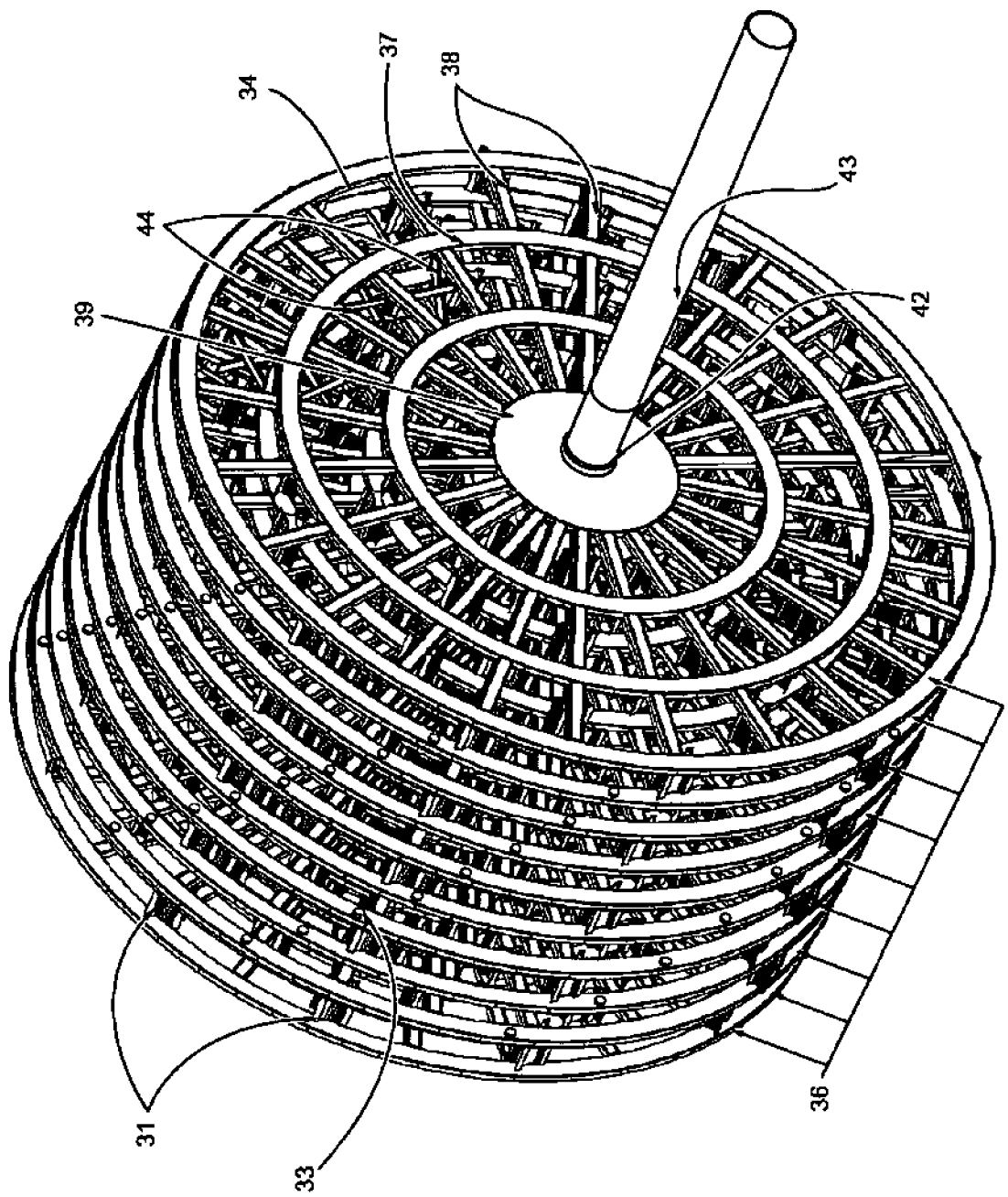
FIG. 6 is an isometric view of the HKT-Wheel having attached multiple independent HKT-Wheels body members providing an exemplary embodiment of the present disclosure.

FIG. 6 is an isometric view of the HKT-Wheel Turbine 20 having attached multiple independent HKT-Wheels 36 body members providing an example of one of the multiple arrangements that the HKT-Wheel 20 can be configured.

Figure 7:
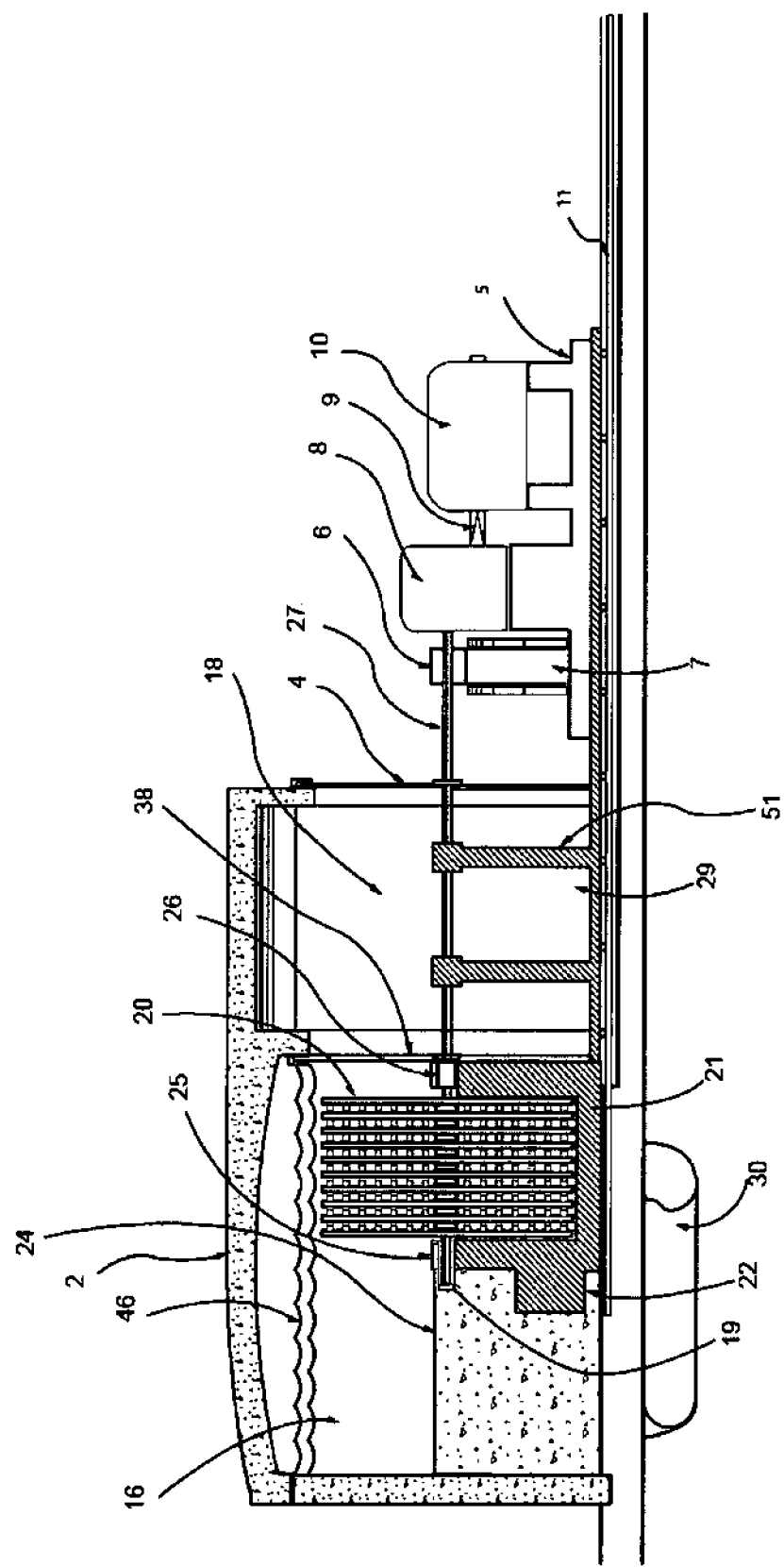
FIG. 7 presents a perspective view of the present invention showing a typical HKT-Wheel, emerged in a fluid inside the container, as illustrated in FIGS. 1 thru 4.

FIG. 7 presents a perspective view of the present invention showing a typical HKT-Wheel 20 in use in the same large-scale power plant or the like 1, illustrated in FIGS. 1 thru 4, with a HKT-Wheel Turbine 20 being generally vertically disposed, having means to restrain the apparatus by a wheel mounting body member, identified as the wheel Mounting Assembly 21, said frame member 21 having a cavity equal to 50% of the height of the runner 20 where the runner 20 rest exposing the upper end into the bed of the body of water 16. The Wheel is attached to the Wheel Mounting Enclosure 21 by restraining the Drive Shaft 43 by a two wheel mounting body member, identified as the Wheel Shaft Bearing Mount 25-26. Said frame member 21 is used when the runner 20 is deployed fully submerged like in FIG. 1 thru 4, FIG. 7 and FIG. 10, and in deployment at others watercourses with natural flowing bodies of water with modifications that might be required to meet the conditions of the watercourse. In deployments fully submerged the Wheel Mounting Enclosure 21 will present a different configuration to reduce the drag cause by the water into the structure of the base. In deployments partially submerged the Wheel Mounting Assembly 21 will be modified to meet the requirements of deployment.

Figure 10:
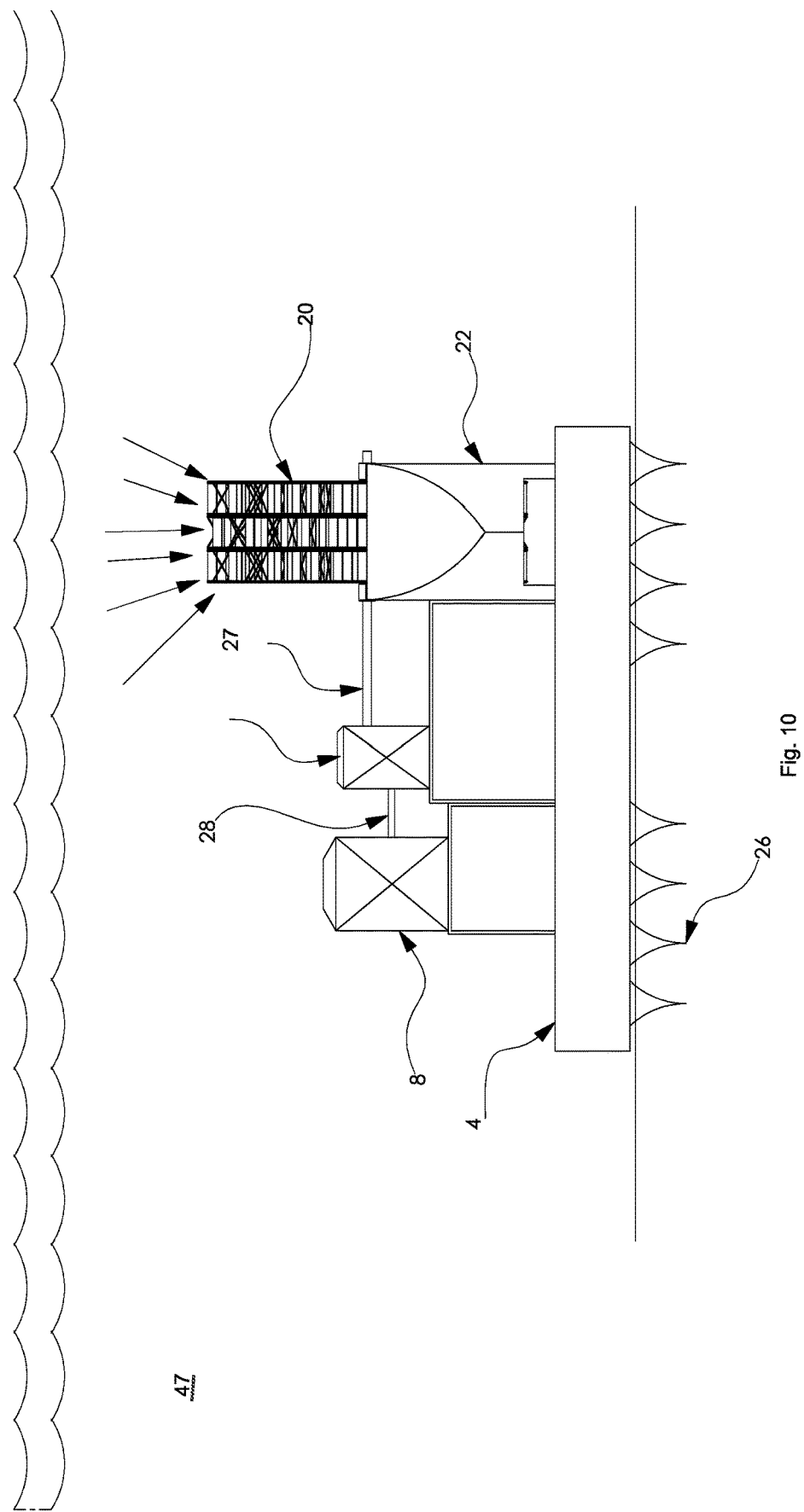
FIG. 10 is a perspective view of the present disclosure in use in a flowing body of water or deployed in the ocean floor.

The Wheel Mounting Enclosure 21 is of solid construction having a cavity created within the mount 21. Said cavity is equal to 50% of the height of the runner 20 where the runner 20 rest exposing the upper/lower end into the bed of the body of water 16. The space between the HKT-Wheel Turbine 20 and the internal walls of the Wheel Enclosure 21 is the smallest engineering design tolerance will permit allowing the lowest opposite force to the pair effectively engaged in the water. FIG. 7 and FIG. 10 is a cut out to illustrate the concept.

Common waterwheels designs avoid the natural behavior of fluids while immerse, or the form drag. The form of an object in fluids mechanics is defined by its shape. The shape of an object located in some space is the part of that space occupied by the object, as determined by its external boundary abstracting from other properties such as material composition, as well as from the object's other spatial properties, such as position and orientation in space. Therefore, the fixed location and angle of the cell within the waterwheel, as it traverse the orbital rotation axis, becomes engaged in the opposite direction of the water flow, creating a form drag of opposite force over the axle, where the performance began to decay. We shall refer to this spatial moment as the point in the waterwheel where the cell becomes a retreating blade.

In the HKT-Wheel Turbine 20 the effects of the retrieving blade are neutralized by the Wheel Enclosure 21 separated from the wheel 20 consistent with design capacity factors. The design will allow the blade to transfer the kinetic energy from the water to the wheel shaft 44 in the 180 degrees effective of the orbital wheel position. It will de-load as it enters the Wheel Enclosure 21 without creating undue friction or pressure on the HKT-Wheel Turbine 20 until the kinetic drivers 31 move into position of angle of attack to start again the cycle. The kinetic energy stored in the HKT-Wheel Turbine 20 while rotating is harnessed through a drive shaft 43 connected to the main hub 39 that connects to ancillary equipment such as Electromagnetic Generator 6, Mechanical Drive 7 (only applicable when diploid in dry land like in the COMHES), Step-up Gear 8, designed to improve the generator's 10 performance as illustrated in use in the COM HES 1, and similar deployments in rivers, ocean and tidal currents, exemplified in FIG. 7 and FIG. 10, placed perpendicular to the main hub 43. The generator 10 can be of different configurations in accordance with the available water head and location. When the HKT-Wheel Turbine 20 is deployed in land water flowing bodies FIG. 10, or in the ocean FIG. 10, said frame member 21 will be deployed in a platform 49 containing all body members with means to restrain or anchor the platform 49 from movement by a series anchoring devices 48 such as pylon driven to support the platform or with inverted pyramids shape protrusions at the bottom of the platform designed to settle imbedded or by forced penetration in the bed of the river 47 or ocean 47 or reinforced or modified in accordance with the requirements of the watercourse where the HKT-Wheel Turbine 20 may be use.

The concept of independent KTT-Wheels 36 provides flexibility of maintenance operation. It can be replaced individually when repair is needed with the down time reduced.

One additional advantage of the HKT-wheel Turbine 20 flexibility of configuration is that will allow the interchange of generators with similar Turbine 20 of similar electrical production configuration. Current hydroelectric generators are not interchangeable since each generator is designed to meet specifically the parameters of the available head at the dam and no two dams are identical.

Figure 9:
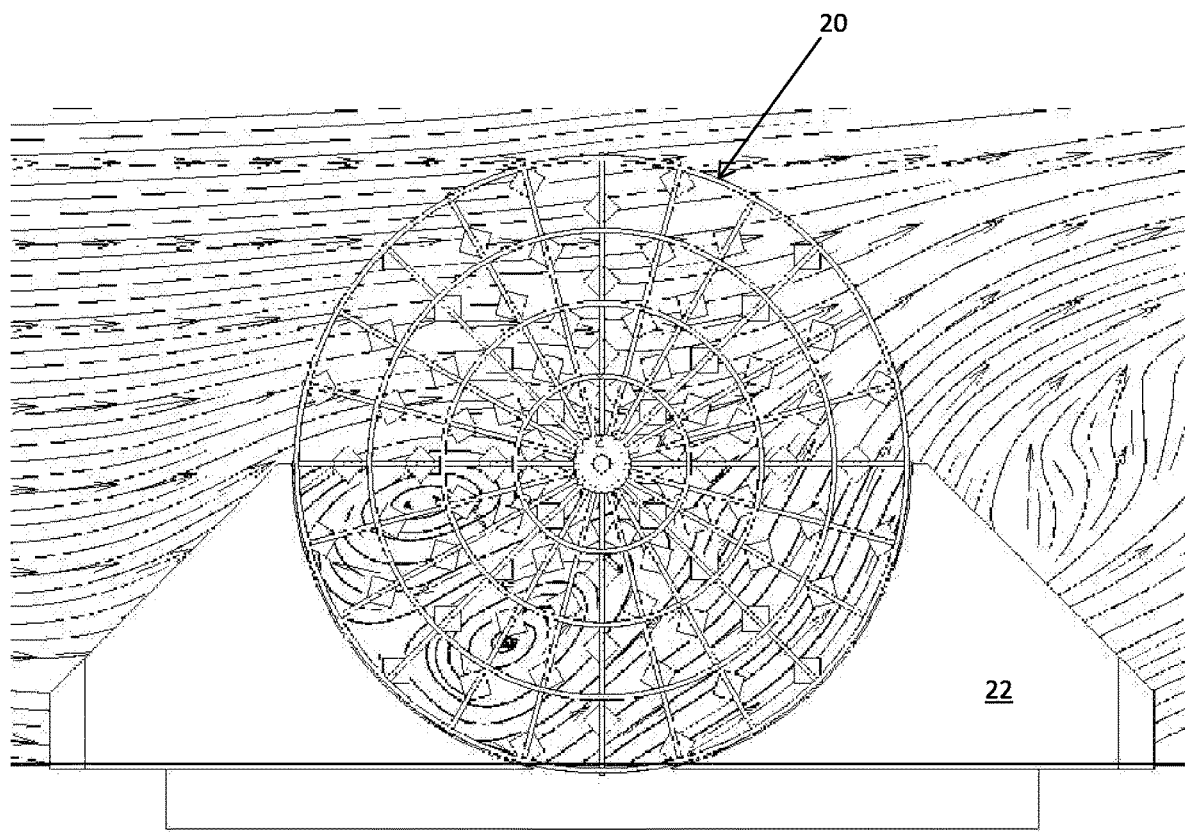
FIG. 9 is a view of the exposed 50% of the HKT-Wheel, that contact the water flow.

FIG. 9 is the front side isometric view of upper/lower 50% of the HKT-Wheel 20, typically the portion of the HKT-Wheel 20 that will be in contact with the water flow, either partially or fully submerged, particularly having being identified in black color each location of the multifaceted Kinetic drivers 31 in relationship with the water incident flow. The drawing illustrate how the runner 20 as it rotates in its axis 43 presents a new angle on each multifaceted cells of Kinetic drivers 31 remaining effectively engaged as the water turbine progresses in its orbital travel allowing the water to traverse the runner 20 impacting simultaneously each multifaceted Kinetic drivers 31 throughout the complete 180 degrees parallel to the water incident flow while occupying wall-to-wall the peripheral annulus of the water stream, as the wheel rotates around its main axis 43. In addition, since the view is isometric, the X shape bracing 44 between Kinetic drivers 31 on the spoke 38 are not visible; however, the location of the Kinetic drivers 31 of the adjacent independent HKT-Wheel 36, identified in white, provides a good perspective of the open space between the cells of Kinetic drivers 31, providing a clear illustration of how the cells of Kinetic drivers 31 combined, cover the full annulus across the wheel and in the 180 degrees of radial direction of the water incident flow and allowing the water to flow through the HKT-Wheel 20 creating the necessary acceleration translated into angular momentum to achieve the efficiency required to generate electricity.

FIG. 10 is a perspective view of the present invention showing the HKT-Wheel 20 in use in a bed of flowing water or deployed in the ocean floor. The waterwheel turbine 20 on deployments fully submerged on natural flowing bodies of water will have all its components and distribution cable to onshore stations totally submerged into the bed of the watercourse, securely restrained or anchored, water proofed, airtight, protected and supported.

The deployment and retrieval of the HKT-Wheel 20, when necessary for maintenance, will be accomplished as a unit by means of a suitable marine deployment ship with cranes. By having option for deployment, the platforms stations/structures could be permanently erected to facilitate the transmission of electricity to shore facilities; however, it provides also the option for deployment fully submerged where it will make easier the common use of ocean waters in shipping lanes where more tide influenced or ocean currents resources exist, in addition, the complete operation of harvesting kinetic energy can be made totally to disappear from view, does not harm the wildlife and can respect the natural beauty of the landscape where it is used. The view also illustrates the flexibility of the HKT-Wheel 20 to operate in both directions of the movement of tidal currents without the need to reposition the HKT-Wheel 20. Other elements previously disclosed are also shown.

Figure 11:
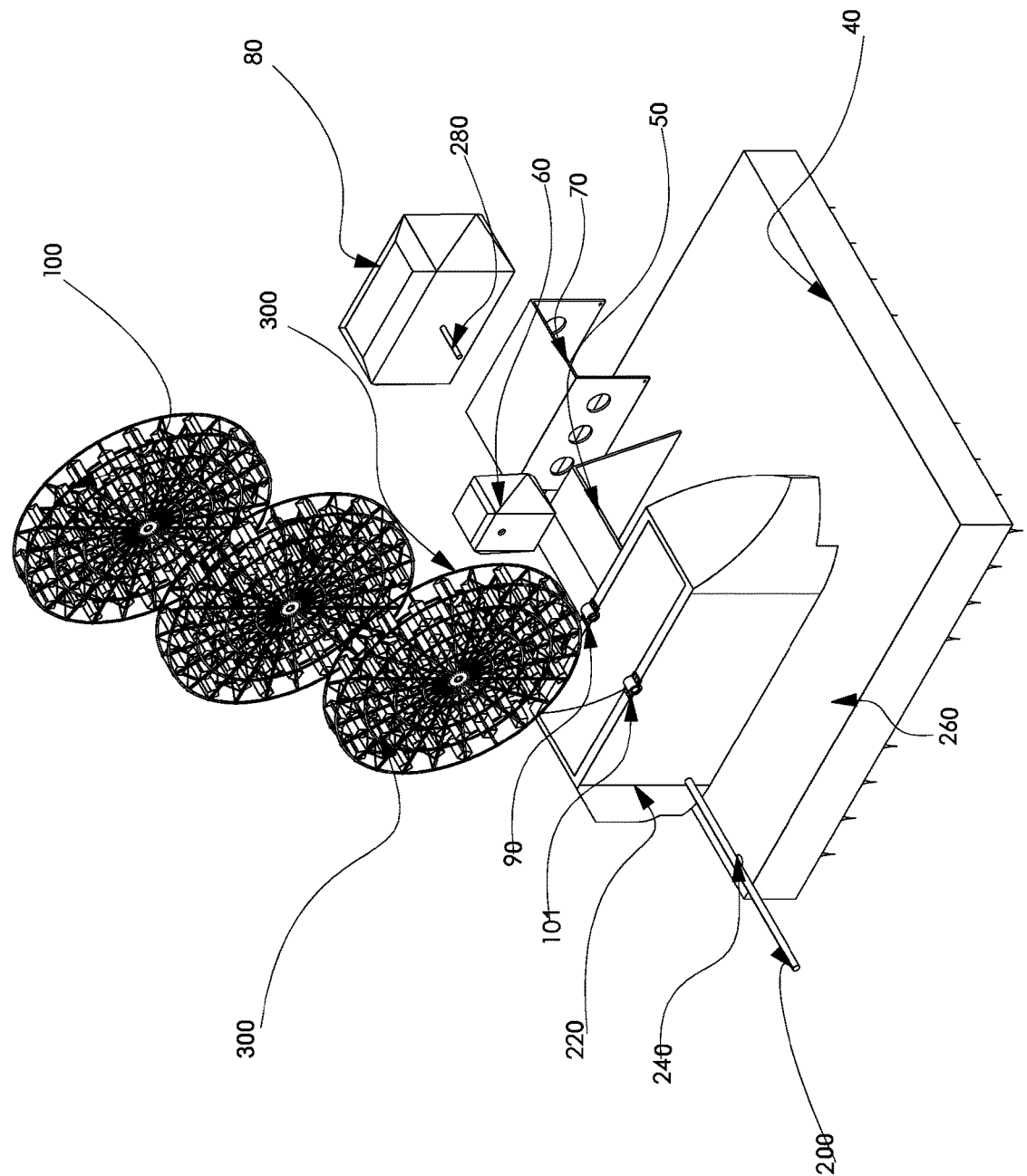
FIG. 11 presents an exploded perspective view of the present invention showing a typical HKT-Wheel comprising buckets with the illustration of additional components.
Figure 12:
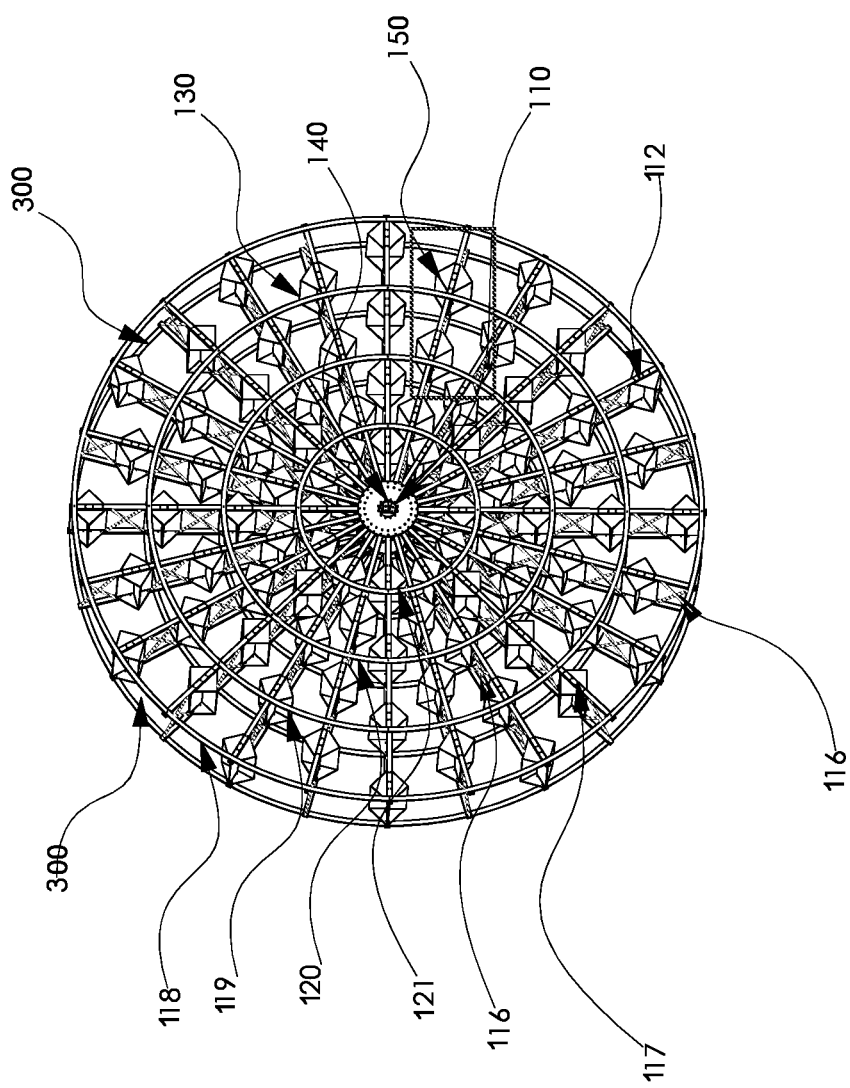
FIG. 12 presents a perspective view of the present invention showing a typical HKT-Wheel comprising buckets.

The FIG. 11-FIG. 13 relates generally to a HKT-Wheel Turbine 100, and more specifically, of modular design including buckets 130, that operates while totally submerge by means of a covered wheel mount 220 that exposed the upper part of the HKT-Wheel Turbine or runner 100 to the incoming water flow and shielding and/or masking the lower 50% of the wheel turbine(s) from the dynamic pressure of the water flow.

Similar to FIG. 1 through FIG. 8, the power plant using HKT-Wheel Turbine or runner 100 from FIG. 11-13 gains its power and momentum by allowing the available water head to penetrate the runner 100 impacting a plurality of multi-faceted buckets 130 attached to spokes 150 in a linear manner, such as providing spokes 150 with three bucket per spoke 117 or four bucket per spoke 112, radiating from a main hub 110 body member, to the outer wheel ring 180, covering 180 degrees across the entire HKT-Wheel Turbine 100 diameter exposed from the mount 220; these multifaceted buckets 130 always presenting a new facet to the influent flow as they rotate around the wheel axis 200 coming out from the mount cavity. The HKW-Generator comprises one or more hydrokinetic wheel turbine 100 assembly vertically disposed, that rotate about a horizontally-oriented axis of the main shaft 200 normal to the current flow, with each hydrokinetic wheel turbine 100 comprises a main hub 110 body member that houses at least a pair of circular wheel frames 300, with each circular wheel frame 300 consisting of an inner ring 121, two middle rings 119-120 and outer ring 118 connected by a plurality of spokes 150, emanating radially from said main hub 110 body member, with a plurality of multifaceted buckets 130 disposed perpendicular on the inside perimeter of the spokes 150 whereby the kinetic energy of the flowing water is captured; a main shaft 200 upon which the wheel turbine rotates, a step-up gear drive assembly 60 attached to the main shaft 200 arranged to improve and transmit rotational movement to a generator 80 attached to the step-up gear assembly 6, through an improved rotational shaft 280, and a deployment base/platform 400 over which the HKT-generator system is mounted for deployment.

As mentioned before, the hydrokinetic wheel turbine 100 are locked into the main shaft 200 as the wheel is slipped through a plurality of hub key slot 140 designed into the wheel main hub 110, into a plurality of driveshaft key 240 designed into the main shaft 200, held in place by wheel hub locking rings 270 positioned at each end of the hydrokinetic wheel turbine 100. The hydrokinetic wheel turbine 100 will be able to work in both direction should the deployment location requires it. The hydrokinetic wheel turbine 100 and main shaft 200 are fixed to the covered wheel mount 220 by means of two bearing mounts 90 and 101. Said wheel covered mount 220, on deployments fully submerged, exposes the upper 50% of the runner(s) 100 to the dynamic pressure of the current of the water source while shielding the bottom 50% from the dynamic pressure of the water incident flow.

Further, as mentioned above, the buckets 130 are mounted in the inside periphery of the spokes 150, distributed between the wheel central hub 110 and the outer ring 121.

The task of these multifaceted buckets 130 is to react to the available water head consistent with the form drag created by the shape of the buckets 130 providing maximum resistance to the current flow over them as to cause the runner 100 to rotate along its horizontal axis 200.

The open spaces separating each cells/buckets 130 are occupied by a plurality of interlocking X shape bracing 160, providing lateral support between the spokes 150 and the bucket 130. Thus, the multifaceted buckets 130 will be positioned behind each interlocking X shape bracing 160 presented by the spoke 150 in front. The rigid structure will be capable of withstanding the extended exposure to the hydrodynamic forces of roll, pitch, jaw, and dynamic pressure of the water incident flow, transferring all stresses toward the core and center of the wheel turbine 100.

The FIG. 14-FIG. 19B relates generally to a covered wheel mount 2200 for the Wheel Turbine 2000, and more specifically to a totally submerge wheel mount 2200 that exposed the upper part of the Wheel Turbine 2000 to the incoming water flow and shielding and/or masking the lower part of the wheel turbine 2000 from the dynamic pressure of the water flow.

Figure 14:
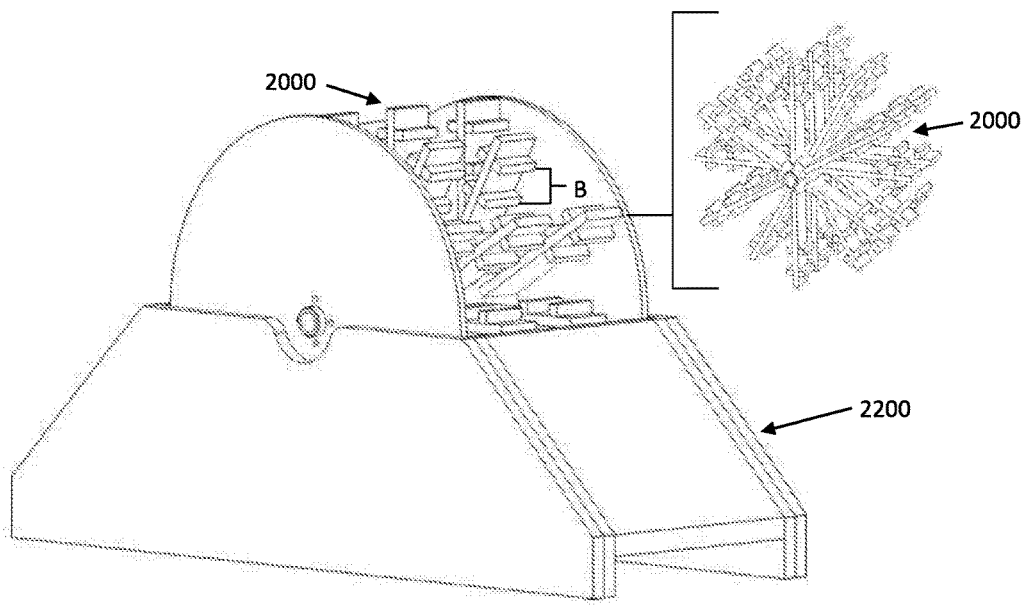
FIG. 14 presents a perspective view of the present invention showing a second mount with the rotary element.
Figure 15A:
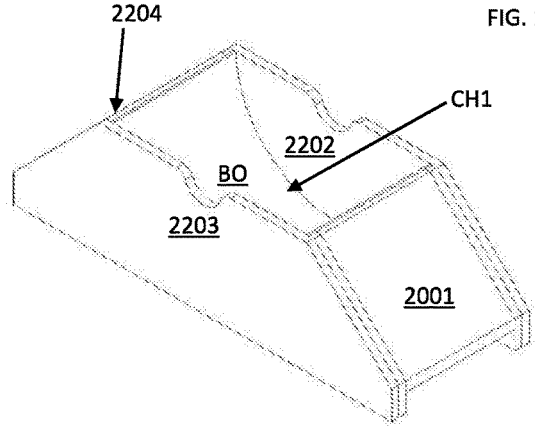
FIGS. 15A-15C presents perspective views of the present invention showing a second mount without the rotary element.
Figure 15B:
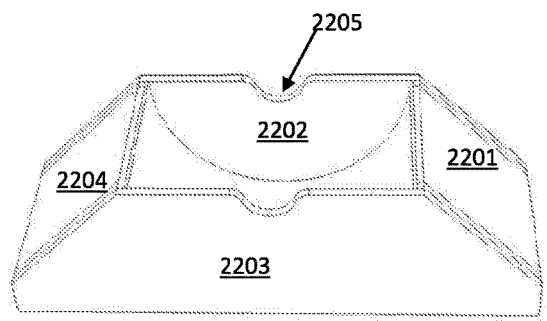
Figure 15C:
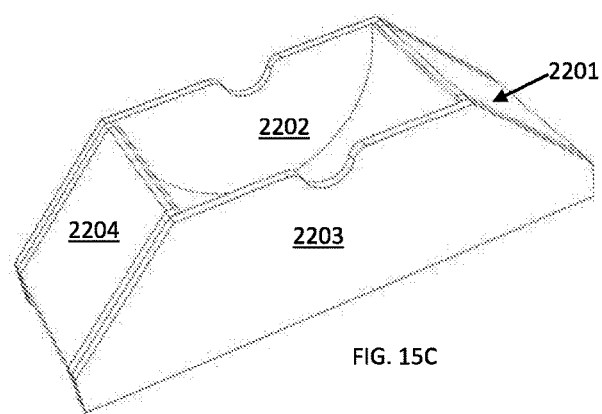
Figure 16A:
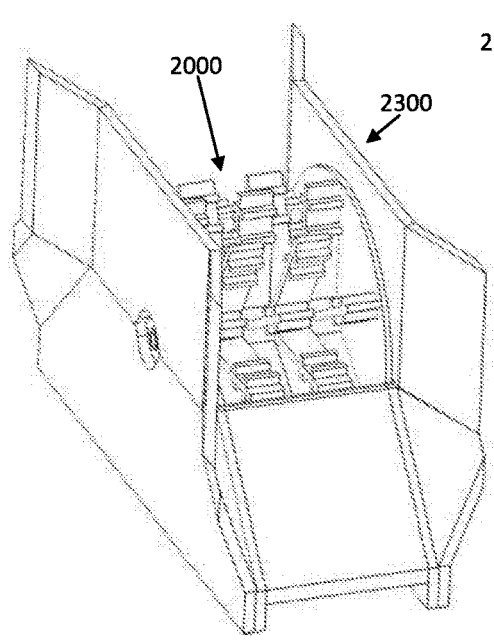
FIGS. 16A-16B presents perspective views of the present invention showing a second mount with vertical walls including the rotary element.
Figure 16B:
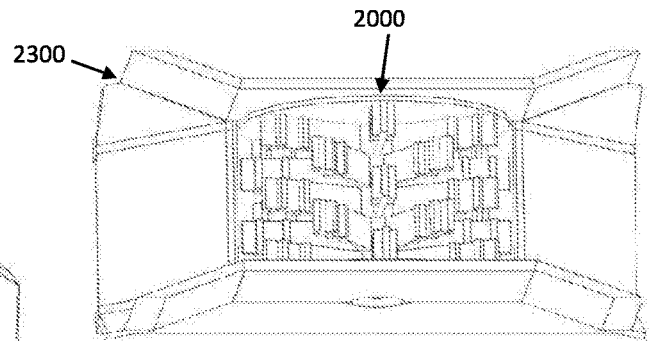
Figure 17A:
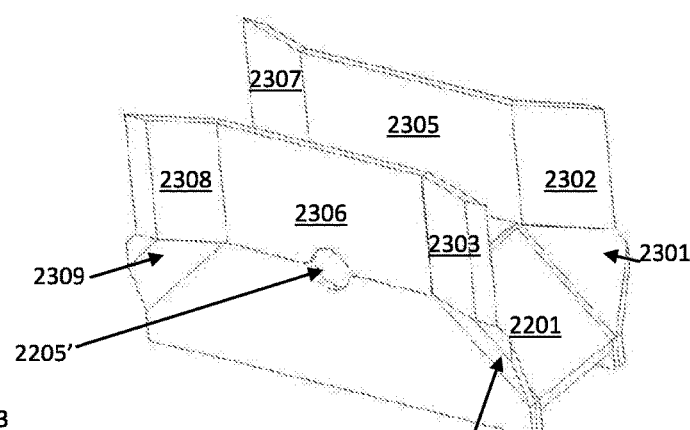
FIGS. 17A-17C presents perspective views of the present invention showing a second mount with vertical walls without the rotary element.
Figure 17B:
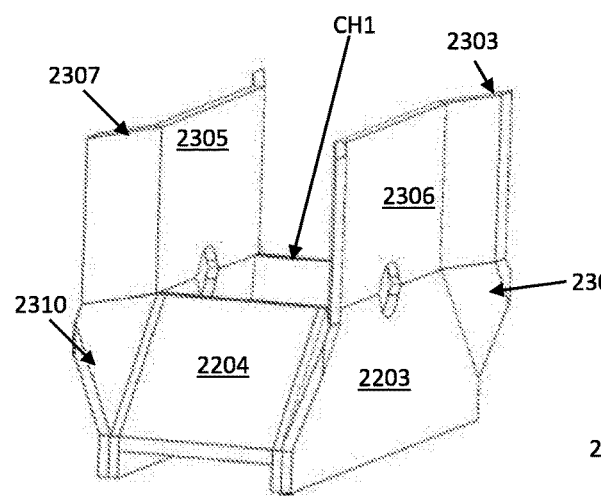
Figure 17C:
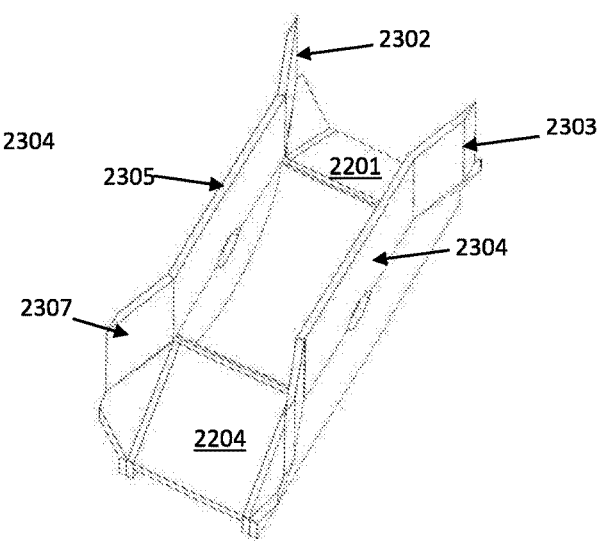

Similar to FIG. 10, FIG. 14 discloses using rotary element or turbine 2000 for an energy system which gains its power and momentum by allowing the available water, more particularly the water flow to impact/push a plurality of multifaceted cells comprising at least a concave surface B attached to extended body in a linear manner radiating from a main hub body member generating a rotational motion. FIG. 14 through 15C are directed to a fully submerged turbine 2000, said turbine 2000 comprising at least a rotary element, wherein said rotary element comprises a main horizontal axle drive; a plurality of multifaceted cells, wherein each multifaceted cell from said plurality of multifaceted cells comprises at least a concave structure B, at least a mount fully submerged 2200 comprising a base 2200, wherein said base comprises at least two solid walls 2202, 2203, a bottom wall BO and at least a tapered outer surface 2201, 2204; wherein said at least two solid walls 2202, 2203 extends vertically from the bottom wall BO creating a cavity; and wherein said rotary element 2000 is mounted on said mount 2200, wherein said mount 2200 encloses a first portion of said rotary element inside said cavity CH1 shielding said first portion and wherein a second portion of said rotary element extends away from said cavity CH1. The mount 2200 further comprises at least a recess 2205 for adjusting a bearing 101, as shown in FIG. 13. The base comprises an outer structure including a tapered configuration as shown in FIG. 13 through FIG. 15B. The tapered outer surface 2201, 2204 provides a smooth surface and a path with less resistance for the flow entering and/or passing across the rotary element 2000. For example, due to the vertical extended flat body of the mount structure located on top of a surface, such as the ocean floor, resistance is generated for some of the incident flow prior interacting with the rotary element 2000. A tapered surface 2201, 2204, as presented in FIG. 14 through 19, redirect the flow towards the rotary element 2000 and reduces the impact of the incident flow with the mount outer structure before interacting with the rotary element 2000. As mentioned before, the wheel turbine or rotary element 2000 are locked into the main shaft and said main shaft are fixed to the covered wheel mount 2200 by means of two bearing mounts 101, for example see FIG. 13. Said wheel covered mount 2200, on deployments fully submerged, exposes the upper part of the rotary element 2000 to the dynamic pressure of the current of the water source while shielding the bottom part from the dynamic pressure of the water incident flow.

Figure 18:
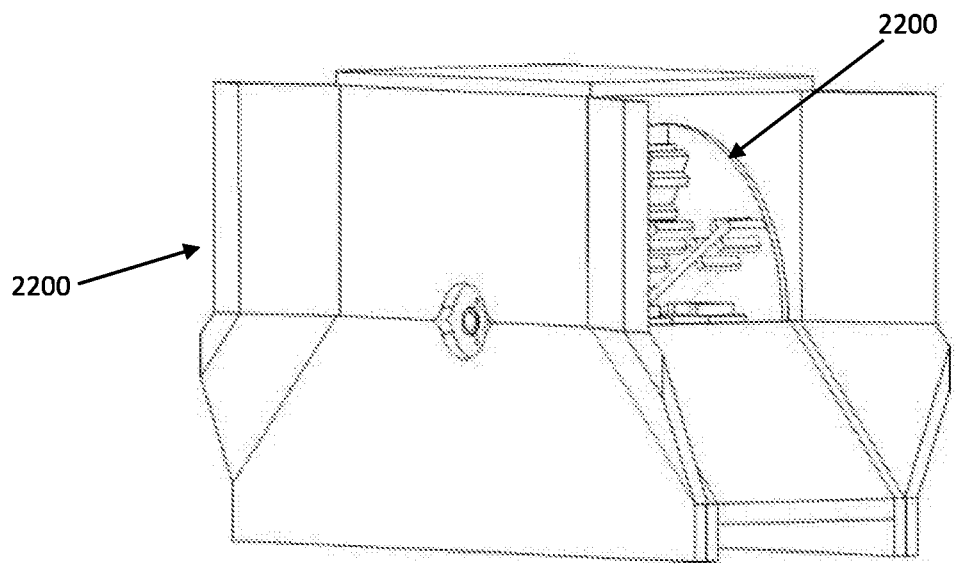
FIG. 18 presents a perspective view of the present invention showing a second mount with vertical walls and a top cover including the rotary element.
Figure 19A:
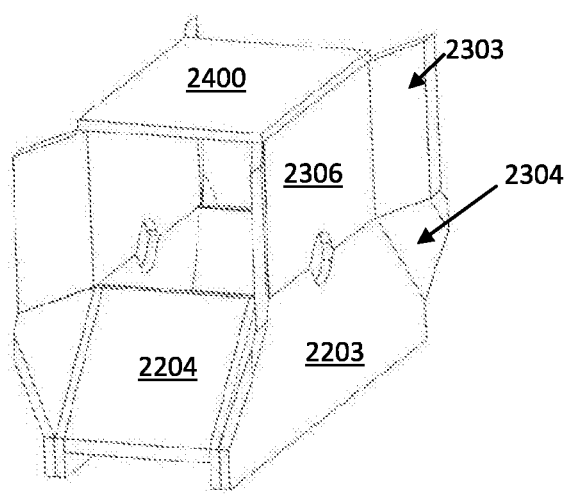
FIGS. 19A-19B presents perspective views of the present invention showing a second mount with vertical walls and a top cover without the rotary element.
Figure 19B:
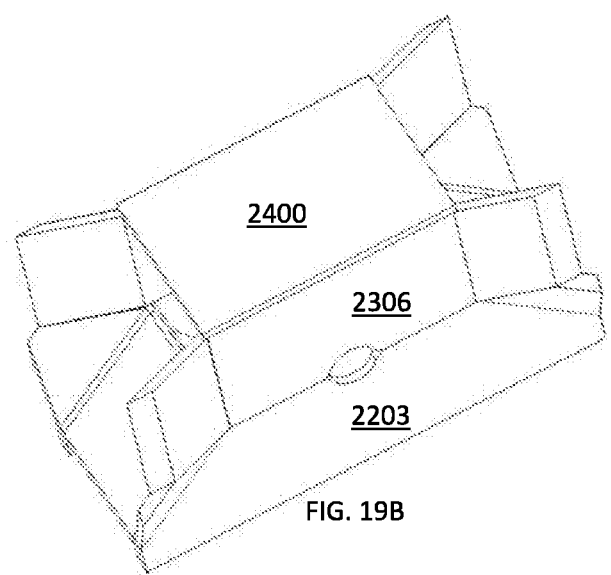

Further, in order to provide a more efficient path for the incident flow at least two vertical walls 2300 extends from the base 2200. The two vertical walls 2305, 2306 creates a channel for the incident flow to impact/push the rotary element 2000. As shown in FIG. 16A through 17C, the vertical wall 2305, 2306 extend away from the cavity covering the side structure of the turbine 2000. Further inclined vertical walls 2304, 2303, 2307, 2308, 2309, 2310 are provided for redirecting the incident flow toward the rotary element 2000. The inclined vertical walls 2304, 2303, 2307, 2308, 2309, 2310 extend perpendicular from the base and angular with respect to the vertical wall 2306, 2305 and base 2200 perimeters. FIG. 18 through 19B are directed to a top cover 2400 located on top of the vertical walls 2305, 2306. The top cover further limit and redirect the incident flow interacting with the rotary element 2000. The combination of the top cover 2400, vertical walls 2305, 2306, inclined vertical walls 2304, 2303, 2307, 2308, 2309, 2310 and tapered outer surface 2201, 2204 increases the speed of a fluid interacting with the rotary element 2000.

The present invention has been illustrated by the description of an exemplary processes and system components and while the various processes and components have been described in considerable detail, it has not be the intention of the presentation in any way as to limit the scope of the invention to such details as to preclude any additional advantages and modifications which may also readily appear to those ordinarily skilled in the art. The invention in its broadest aspects is therefore not limited to the specific details, implementations, or illustrative examples shown and described. Accordingly, departures may be made from such details without departing from the spirit' or scope of applicant's general inventive concept. For a definition of the complete scope of the invention, the reader is directed to the appended claims.

The invention claimed is:

1. A hydrokinetic transport wheel mount, comprising:
    a fully submerged turbine in the ocean;
    wherein said fully submerged turbine comprises a rotary element and said rotary element comprises a main horizontal axle drive;
    a plurality of multifaceted cells, wherein each multifaceted cell from said plurality of multifaceted cells comprises a concave structure;
    a fully submerged mount comprising a base, wherein said base comprises a front wall, a rear wall, a bottom wall and at least two tapered sidewalls;
    wherein said bottom wall is connected to the front wall, to the rear wall and to the at least two tapered sidewalls;
    wherein each tapered sidewall is connected to the front wall and to the rear wall;
    wherein said front wall, rear wall and the at least two tapered sidewalls extend vertically from the bottom wall creating a cavity in the fully submerged mount;
    wherein said rotary element is mounted on the fully submerged mount;
    wherein the cavity of said fully submerged mount completely encloses a first half of the rotary element inside said cavity when the rotary element rotates along its axis, thus shielding said first half from the pressure created by the flow of passing fluids and wherein a second half of the rotary element remains outside of said cavity completely exposed to the pressure created by the flow of passing fluids, as the rotary element rotates along its axis; and wherein the front wall and rear wall comprise bearings for allowing rotation of the horizontal axle drive on the fully submerged mount.

2. The hydrokinetic transport wheel mount of claim 1, wherein
said first half is the bottom half of said rotary element.

3. The hydrokinetic transport wheel mount of claim 1, wherein
said second half is the upper half of said rotary element.

4. The hydrokinetic transport wheel mount of claim 1, further comprising at least one recess located in the front wall and at least one recess located in the rear wall capable of receiving the bearings for allowing rotation of the horizontal axle drive on the fully submerged mount.

5. The hydrokinetic transport wheel mount of claim 1, further comprising a first vertical wall that is connected to and extends vertically from the front wall and a second vertical wall that is connected to and extends vertically from the rear wall.

6. The hydrokinetic transport wheel mount of claim 5, further comprising one or more inclined vertical walls connected to the first vertical wall and or more inclined vertical walls connected to the second vertical wall.

7. The hydrokinetic transport wheel mount of claim 6, wherein the one or more inclined vertical walls are perpendicularly connected to the corresponding tapered sidewall and are also connected at an angle to a corresponding side end of the first vertical wall and to a corresponding side end of the second vertical wall, in order to redirect the flow of incoming fluids towards the rotary element.

8. The hydrokinetic transport wheel mount of claim 5, further comprising a top cover connected to the first vertical wall and to the second vertical wall.

* * * * *